United States Patent
Anantharaman et al.

(10) Patent No.: US 12,375,995 B2
(45) Date of Patent: Jul. 29, 2025

(54) AUTOMATED FREQUENCY COORDINATION FOR HIGH SPEED MOBILITY

(71) Applicant: QUALCOMM Incorporated, San Diego, CA (US)

(72) Inventors: Subramanian Anantharaman, Bangalore (IN); Sreekanth Natarajan, Chennai (IN); Sandip Homchaudhuri, San Jose, CA (US); Sujatha Varadarajan, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/945,431

(22) Filed: Sep. 15, 2022

(65) Prior Publication Data
US 2024/0098615 A1     Mar. 21, 2024

(51) Int. Cl.
| | |
|---|---|
| *H04W 40/08* | (2009.01) |
| *H04W 40/10* | (2009.01) |
| *H04W 72/044* | (2023.01) |

(52) U.S. Cl.
CPC ........... *H04W 40/08* (2013.01); *H04W 40/10* (2013.01); *H04W 72/0473* (2013.01)

(58) Field of Classification Search
None
See application file for complete search history.

(56) References Cited

U.S. PATENT DOCUMENTS

| | | | |
|---|---|---|---|
| 11,737,071 B2 * | 8/2023 | Sun | H04W 72/541 370/329 |
| 11,751,068 B2 * | 9/2023 | Ponnampalam | H04L 41/22 370/254 |

(Continued)

OTHER PUBLICATIONS

Federal Communications Commission (FCC (Jay Holcomb (ITRON)): "FCC_R+O_FNPRM_promoting_unlicensed_use_of_the_6GHz_band_ET_18-295", IEEE Draft, IEEE-SA Mentor, Piscataway, NJ, USA, vol. 802.18, No. 1, Apr. 27, 2020, pp. 1-141, XP068167648, retrieved from the internet: URL:https://mentor.ieee.org/802.18/dcn/20/18-20-0062-01-0000-fcc-r-o-fnprm-promoting-unlicensed-use-of-the-6ghz-band-et-18-295.docx.

(Continued)

*Primary Examiner* — Clemence S Han
(74) *Attorney, Agent, or Firm* — Holland & Hart / QUALCOMM Incorporated

(57) ABSTRACT

This disclosure provides systems and methods for use of automated frequency coordination (AFC) to manage transmission power and frequencies. In some implementations, a device transmits, to a network entity, an AFC request. The device receives, from the network entity, an AFC response, the AFC response including an AFC power level indication of one or more nearest neighboring entities. The device sets a transmit power of the device based at least in part on the AFC power level indication of at least one of the one or more nearest neighboring entities, and the device transmits at the transmit power. In some instances, the device transmits a first number of AFC requests during a first instance of travelling along a path and transmits a second number of AFC requests less than the first number of AFC requests during one or more successive instances after the first instance of travelling along the path.

30 Claims, 16 Drawing Sheets

(56) References Cited

U.S. PATENT DOCUMENTS

| | | | |
|---|---|---|---|
| 2011/0080882 A1* | 4/2011 | Shu .................... | H04W 28/26 |
| | | | 370/329 |
| 2012/0170534 A1 | 7/2012 | Kim et al. | |
| 2014/0038655 A1 | 2/2014 | Garnett et al. | |
| 2014/0228065 A1* | 8/2014 | Almeida ............ | H04W 52/243 |
| | | | 455/509 |
| 2019/0268906 A1* | 8/2019 | Perdomo ............... | G01S 19/13 |
| 2020/0367020 A1 | 11/2020 | Ansley et al. | |
| 2021/0120556 A1* | 4/2021 | Segev .................. | H04W 28/16 |
| 2021/0360633 A1* | 11/2021 | Chu .................... | H04W 52/365 |
| 2023/0379128 A1* | 11/2023 | Wang ................. | H04W 52/283 |
| 2023/0379840 A1* | 11/2023 | Wang ................. | H04W 52/365 |
| 2023/0413189 A1* | 12/2023 | Wang ............... | H04W 72/0453 |
| 2024/0172142 A1* | 5/2024 | Kuriki ................. | H04W 16/14 |
| 2024/0251249 A1* | 7/2024 | Richards ............. | H04W 16/14 |

OTHER PUBLICATIONS

Partial International Search Report—PCT/US2023/029090—ISA/EPO—Nov. 2, 2023.
International Search Report and Written Opinion—PCT/US2023/029090—ISA/EPO—Jan. 2, 2024.

* cited by examiner

AUTOMATED FREQUENCY COORDINATION FOR HIGH SPEED MOBILITY

TECHNICAL FIELD

This disclosure relates generally to wireless communications, and more specifically, to use of automated frequency coordination (AFC) for mobile wireless devices.

DESCRIPTION OF THE RELATED TECHNOLOGY

A wireless local area network (WLAN) may be formed by one or more access points (APs) that provide a shared wireless medium for use by a number of client devices such as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP in beacon frames periodically broadcasted over the wireless medium so that STAs within wireless range of the AP can associate with the AP and establish a wireless communication link with the WLAN.

In some geographic locations, portions of the 6 gigahertz (GHz) wireless band has been made available for use by wireless communication devices conforming to the IEEE 802.11 family of standards or another set of suitable standards (such as the European Telecommunications Standards Institute (ETSI) family of standards in Europe). As the 6 GHz band includes licensed microwave communications, public communication systems, and other potentially established systems, wireless communication devices (such as an AP of a WLAN) use automated frequency coordination (AFC) to determine the transmit power and the specific frequencies to be used to not interfere with established devices in the 6 GHz band, thus enabling unlicensed access to the 6 GHz band by such wireless devices. As such, AFC enables an AP to share the 6 GHz wireless medium with incumbent devices using the 6 GHz band.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless device. The wireless device can include at least one processor and at least one memory communicatively coupled with the at least one processor. In some implementations, the memory stores processor-readable code that, when executed by the at least one processor, is configured to cause the device to transmit an automated frequency coordination (AFC) request. Execution of the processor-readable code is configured to cause the device to receive an AFC response, where the AFC response includes an AFC power level indication of one or more nearest neighboring entities to the device. Execution of the processor-readable code is further configured to cause the device to set a transmit power of the device based at least in part on the AFC power level indication of at least one of the one or more nearest neighboring entities. Execution of the processor-readable code is also configured to cause the device to transmit at the transmit power.

In various implementations, execution of the processor-readable code is configured to cause the device to transmit a first number of AFC requests during a first instance of travelling along a path and transmit a second number of AFC requests less than the first number of AFC requests during one or more successive instances after the first instance of travelling along the path, the second number of AFC requests based at least in part on setting the transmit power to an AFC power level indication of a neighboring entity, of the one or more nearest neighboring entities, independent of transmitting another AFC request. In some implementations, execution of the processor-readable code is further configured to cause the device to set the number of AFC requests to a required minimum for performing AFC.

In various implementations, the one or more AFC power level indication of the one or more nearest neighboring entities are stored in a table identifying the one or more nearest neighboring entities, a location of each of the one or more nearest neighboring entities, and the AFC power level indication of the one or more nearest neighboring entities.

In various implementations, the AFC power level indication is a binary indication as to whether or not a standard power (SP) transmit power is allowed.

In various implementations, the AFC response includes a VendorExtension object to indicate the AFC power level indication of the one or more nearest neighboring entities.

In various implementations, the AFC response includes a frequency indicator of the one or more nearest neighboring entities to the device. Execution of the processor-readable code is further configured to cause the device to set a transmit frequency based at least in part on the frequency indicator of the one or more nearest neighboring entities to the device. Transmission at the transmit power includes transmission at the transmit frequency.

Another innovative aspect of the subject matter described in this disclosure can be implemented as a method for wireless communication by a device. In some implementations, the method includes transmitting an AFC request. The method includes receiving an AFC response, where the AFC response includes an AFC power level indication of one or more nearest neighboring entities to the device. The method further includes setting a transmit power of the device based at least in part on the AFC power level indication of at least one of the one or more nearest neighboring entities. The method also includes transmitting at the transmit power.

In various implementations, the method further includes transmitting a first number of AFC requests during a first instance of travelling and transmitting a second number of AFC requests less than the first number of AFC requests during one or more successive instances after the first instance of travelling, the second number of AFC requests based at least in part on setting the transmit power to an AFC power level indication of a neighboring entity, of the one or more nearest neighboring entities, independent of transmitting another AFC request. In some implementations, the method also includes setting the number of AFC requests to a required minimum for performing AFC.

In various implementations, the AFC power level indication of the one or more nearest neighboring entities are stored in a table identifying the one or more nearest neighboring entities, a location of each of the one or more nearest neighboring entities, and the AFC power level indication of the one or more nearest neighboring entities.

In various implementations, the AFC power level indication is a binary indication as to whether or not a SP transmit power is allowed.

In various implementations, the AFC response includes a VendorExtension object to indicate the AFC power level indication of the one or more nearest neighboring entities.

In various implementations, the AFC response includes a frequency indicator of the one or more nearest neighboring entities to the device. The device sets a transmit frequency based at least in part on the frequency indicator of the one or more nearest neighboring entities to the device. Transmission at the transmit power includes transmission at the transmit frequency.

Another innovative aspect of the subject matter described in this disclosure can be implemented in a wireless device. The wireless device can include at least one processor and at least one memory communicatively coupled with the at least one processor. In some implementations, the memory stores processor-readable code that, when executed by the at least one processor, is configured to cause the device to transmit, to a network component in a cellular network, an AFC request based at least in part on an AFC event. Execution of the processor-readable code is configured to cause the device to receive, from the network component, an AFC response. Execution of the processor-readable code is further configured to cause the device to identify a transmit power to be used by one of an access point (AP) or a station (STA) based on the AFC response. Execution of the processor-readable code is also configured to cause the device to instruct that the one of the AP or the STA use a specific transmit power level for transmission.

In various implementations, the device is included in the one of the AP or the STA, the AFC request is transmitted to a network entity, the AFC response is received from the network entity, and the AFC event includes one of the one of the AP or the STA crossing a cellular based location border, a handoff of the AP between network entities, or an AFC associated timer indicating an AFC request is to be sent. In some implementations, execution of the processor-readable code is further configured to cause the device to obtain a plurality of locations of the one of the AP or the STA associated with a plurality of AFC events during one or more instances of travelling. Execution of the processor-readable code is also configured to cause the device to determine a location pattern over time of the one of the AP or the STA based at least in part on the plurality of locations of the one of the AP or the STA associated with the plurality of AFC events. Execution of the processor-readable code is further configured to cause the device to transmit a second number less than a first number of AFC requests to the network entity during a successive instance after the one or more instances of travelling based at least in part on the location pattern, the first number of AFC requests transmitted during an instance of the one or more instances of travelling along the path and the second number of AFC requests based at least in part on setting the transmit power of the one of the AP or the STA to a transmit power associated with one of the plurality of locations of the one of the AP or the STA and one of the plurality of AFC events independent of transmitting another AFC request.

In various implementations, the device is included in a cellular network controller to receive one or more AFC requests from the AP and provide one or more AFC responses to the AP, the AFC event includes receiving an AFC request from the AP, the AFC request to be transmitted by the device is to be transmitted to an AFC server in the cellular network, and the AFC response to be received by the device is to be received from the AFC server. In some implementations, execution of the processor-readable code is further configured to cause the device to obtain one or more locations of the one of the AP or the STA during one or more instances of the one of the AP or the STA travelling, the one or more locations associated with one or more AFC events. Execution of the processor-readable code is also configured to cause the device to obtain a corresponding transmit power associated with each of the one or more locations.

In some implementations, execution of the processor-readable code is further configured to cause the device to receive another AFC request from the AP, obtain a first location of the one of the AP or the STA, and transmit an AFC response to the AP independent of transmitting an AFC request to the AFC server, the AFC response indicating a current transmit power to be used by the one of the AP or the STA, the current transmit power based at least in part on the first location of the one of the AP or the STA, the one or more locations of the one of the AP or the STA, and the one or more corresponding transmit powers associated with the one or more locations. In some implementations, execution of the processor-readable code is further configured to cause the device to transmit a first number of AFC requests to the AFC server during a first instance of the one of the AP or the STA travelling, the first number of AFC requests associated with the one of the AP or the STA. Execution of the processor-readable code is also configured to cause the device to determine one or more of a location pattern of the one of the AP or the STA over time based at least in part on the one or more locations of the one of the AP or the STA or an AFC request pattern of the AP over time based at least in part on one or more AFC requests received from the AP. Execution of the processor-readable code is also configured to cause the device to transmit a second number of AFC requests less than the first number of AFC requests to the AFC server during one or more successive instances after the first instance of the one of the AP or the STA travelling, the second number of AFC requests based at least in part on transmitting one or more AFC responses to the AP indicating a transmit power to be used by the one of the AP or the STA based at least in part on one or more of the location pattern or the AFC request pattern and the one or more AFC responses transmitted to the AP are transmitted independent of transmitting another AFC request to the AFC server.

In some implementations, execution of the processor-readable code is further configured to cause the device to receive a first number of AFC responses associated with the first number of AFC requests, with the second number of AFC requests based on the location pattern and the location pattern determined based on a logistic model and the first number of AFC requests.

In various implementations, execution of the processor-readable code is further configured to cause the device to transmit a plurality of AFC requests, with the plurality of AFC requests being transmitted in a random manner.

In various implementations, execution of the processor-readable code is further configured to cause the device to transmit a first number of AFC requests to the AFC server during a first instance of the one of the AP or the STA travelling, with transmitting each of the first number of AFC requests being based on expiration of a first time at a timer. Execution of the processor-readable code is also configured to cause the device to transmit a second number of AFC requests to the AFC server during a second instance of the one of the AP or the STA travelling, with transmitting each of the second number of AFC requests being based on expiration of a second time at the timer, the second time being greater than the first time.

In various implementations, execution of the processor-readable code is further configured to cause the device to transmit a number of AFC requests, the number of AFC requests based on a memory size of the device.

In various implementations, the device is to identify a transmit frequency to be used and instruct the one of the AP or the STA to use the transmit frequency for transmission.

Another innovative aspect of the subject matter described in this disclosure can be implemented in a method for wireless communications by a device. The method includes transmitting, to a network component in a cellular network, an AFC request based at least in part on an AFC event. The method also includes receiving, from the network component, an AFC response. The method further includes identifying a transmit power to be used by one of an AP or a STA based on the AFC response. The method also includes instructing that the one of the AP or the STA use a specific transmit power level for transmission.

In various implementations, the device is included in the one of the AP or the STA, the AFC request is transmitted to a network entity, the AFC response is received from the network entity, and the AFC event includes one of the one of the AP or the STA crossing a cellular based location border, a handoff of the AP between network entities, or an AFC associated timer indicating an AFC request is to be sent. In some implementations, the method further includes obtaining a plurality of locations of the one of the AP or the STA associated with a plurality of AFC events during one or more instances of travelling. The method also includes determining a location pattern over time of the one of the AP or the STA based at least in part on the plurality of locations of the one of the AP or the STA associated with the plurality of AFC events. The method further includes transmitting a second number less than the first number of AFC requests to the network entity during a successive instance after the one or more instances of travelling based at least in part on the location pattern, the second number of AFC requests based at least in part on setting the transmit power of the one of the AP or the STA to a transmit power associated with one of the plurality of locations of the one of the AP or the STA and one of the plurality of AFC events independent of transmitting another AFC request In various implementations, the device is included in a cellular network controller to receive one or more AFC requests from the AP and provide one or more AFC responses to the AP, the AFC event includes receiving an AFC request from the AP, the AFC request to be transmitted by the device is to be transmitted to an AFC server in the cellular network, and the AFC response to be received by the device is to be received from the AFC server. In some implementations, the method further includes obtaining one or more locations of the one of the AP or the STA during one or more instances of the one of the AP or the STA travelling, the one or more locations associated with one or more AFC events. The method also includes obtaining a corresponding transmit power associated with each of the one or more locations.

In some implementations, the method further includes receiving another AFC request from the AP, obtaining a first location of the one of the AP or the STA, and transmitting an AFC response to the AP independent of transmitting an AFC request to the AFC server, the AFC response indicating a current transmit power to be used by the one of the AP or the STA, the current transmit power based at least in part on the first location of the one of the AP or the STA, the one or more locations of the one of the AP or the STA, and the one or more corresponding transmit powers associated with the one or more locations. In some implementations, the method further includes transmitting a first number of AFC requests to the AFC server during a first instance of the one of the AP or the STA travelling, the first number of AFC requests associated with the one of the AP or the STA. The method also includes determining one or more of a location pattern of the one of the AP or the STA over time based at least in part on the one or more locations of the one of the AP or the STA or an AFC request pattern of the AP over time based at least in part on one or more AFC requests received from the AP. The method also includes transmitting a second number of AFC requests less than the first number of AFC requests to the AFC server during one or more successive instances after the first instance of the one of the AP or the STA travelling, the second number of AFC requests is based at least in part on transmitting one or more AFC responses to the AP indicating a transmit power to be used by the one of the AP or the STA based at least in part on one or more of the location pattern or the AFC request pattern and the one or more AFC responses transmitted to the AP are transmitted independent of transmitting another AFC request to the AFC server.

In some implementations, the method further includes receiving a first number of AFC responses associated with the first number of AFC requests, with the second number of AFC requests based on the location pattern and the location pattern determined based on a logistic model and the first number of AFC requests.

In various implementations, the method further includes transmitting a plurality of AFC requests, with the plurality of AFC requests being transmitted in a random manner.

In various implementations, the method further includes transmitting a first number of AFC requests to the AFC server during a first instance of the one of the AP or the STA travelling, with transmitting each of the first number of AFC requests being based on expiration of a first time at a timer. The method also includes transmitting a second number of AFC requests to the AFC server during a second instance of the one of the AP or the STA travelling along the path, with transmitting each of the second number of AFC requests being based on expiration of a second time at the timer, the second time being greater than the first time.

In various implementations, the method further includes transmitting a number of AFC requests, the number of AFC requests based on a memory size of the device.

In various implementations, the device identifies a transmit frequency to be used and instructs the one of the AP or the STA to use the specific transmit frequency for transmission.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
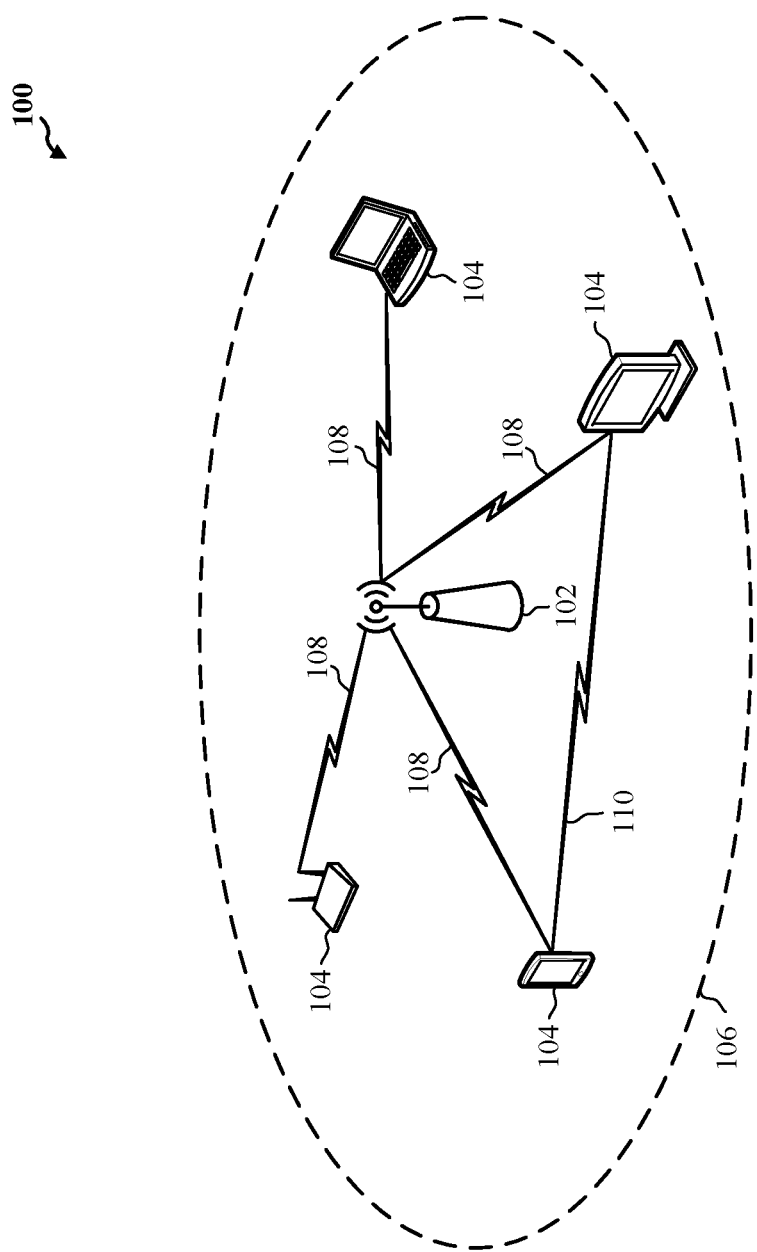
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (JOT) network.

The IEEE 802.11ax amendment of the IEEE 802.11 standard (as well as other standards) describe the use of the unlicensed portion of the 6 Gigahertz (GHz) wireless band for wireless communications, and various locations around the world have opened the 6 GHz wireless band for wireless communications. Various communication devices, though, are licensed in the 6 GHz wireless band, such as specifically licensed point to point microwave communications. To not interfere with previously licensed devices, a wireless device lowers its transmit power for communications in the 6 GHz wireless band. For example, as defined by the Federal Communications Commission (FCC), an access point (AP) may adjust its transmit power (and ensure clients of its wireless local area network (WLAN)) from transmitting at a standard power (SP) to low power indoors (LPI), very low power (VLP) for mobile APs, or to other future power levels that may be defined.

Automated Frequency Coordination (AFC) has been introduced to enable a wireless communication device to transmit at SP in the 6 GHz wireless band when no incumbent device is within the vicinity of the AP. For AFC, an AFC server stores the geographic locations and transmit power restrictions of incumbent devices. For a wireless communication device (such as an AP) in a new geographic location, the wireless communication device sends an AFC request indicating the location (such as its latitude and longitude) of the wireless communication device and requesting from the AFC server the permitted power level for the location based on the stored information on the AFC server. For a mobile wireless communication device (such as APs on busses, trains, and other mobile devices), the wireless communication device repeatedly transmits AFC requests (such as via a cellular network) to identify the allowed transmit power for the current location. As the number of mobile wireless communication devices increases, the number of AFC requests and responses increase, which may saturate, e.g., the cellular network used for transmitting the AFC requests and responses and the AFC server processing and providing the AFC requests and responses. As such, there is a need to reduce the number of AFC requests and responses required to identify and set the transmit power of a wireless communication device while on the 6 GHz wireless band.

Implementations described herein provide various frameworks of using a reduced number of AFC requests and responses to still identify the required transmit powers to be used in the 6 GHz wireless band. Specifically, in some implementations, a device may transmit an AFC request, to a network entity (such as a base station of a cellular network). The device may then receive an AFC response, with the AFC response including an AFC power level indication of one or more nearest neighboring entities to the device. The device may then set a transmit power of the device based at least in part on the AFC power level indication of at least one of the one or more nearest neighboring entities and transmit at the transmit power. By the network entity transmitting AFC responses for nearest neighbors, the device setting a transmit power based on the AFC power level of a neighbor, and/or limiting the transmission of AFC requests to specific AFC events, aspects of the present disclosure may reduce the number of AFC requests sent to a AFC server that are traditionally needed to identify the transmit power of an AP.

In various implementations, the device transmits a first number of AFC requests during a first instance of travelling along a path and transmits a second number of AFC requests less than the first number of AFC requests during one or more successive instances after the first instance of travelling along the path, with the second number of AFC requests being based at least in part on setting the transmit power to one of the one or more AFC power level indications stored by the device independent of transmitting another AFC request. In some other implementations, a device may transmit an AFC request based at least in part on an AFC event, with a network component in a cellular network receiving the AFC request. The device may then receive an AFC response, identify a transmit power to be used by a wireless local area network (WLAN) device based on the AFC response, and instruct that the WLAN device use a specific transmit power level and frequency. In various implementations, the AFC event includes one of the WLAN device crossing a cellular based location border, a handoff of an AP of the WLAN between network entities, or an AFC associated timer indicating an AFC request is to be sent. In various implementations, the AFC responses may also indicate a frequency to be used. In some implementations, the frequency indication may be based on the nearest neighboring entities to the device. The device may identify a frequency to be used based on the AFC response and instruct a WLAN device (which may be itself or another device) to use the frequency for transmitting. In these ways, a mobile AP and stations wirelessly coupled to the mobile AP are able to use AFC to set a transmit power as required (as well as determine which frequencies may be allowed for transmission) while reducing the number of AFC requests and responses needed.

Particular implementations of the subject matter described in this disclosure can be implemented to realize one or more of the following potential advantages. By initially transmitting AFC requests for nearest neighbors or limiting the transmission of AFC requests to specific AFC events, aspects of the present disclosure may reduce the number of AFC requests traditionally needed to identify the transmit power of an AP. By reducing the number of AFC requests, fewer resources of a wireless network to transmit the AFC requests (such as bandwidth of a cellular network and components of a core network) is required. In addition, by reducing the number of AFC requests, an AFC server requires fewer resources and less time to process the AFC requests.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). The WLAN 100 may include numerous wireless communication devices such as an access point (AP) 102 and multiple stations (STAs) 104. While only one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5.0 GHz, 6.0 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan the STA's surroundings to find a more suitable AP 102 with which to associate. For example, a STA 104 that is moving relative to the STA's associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5.0 GHz band, the 60 GHz band, the 3.6 GHz band, and the 900 MHz band. Implementations of the APs 102 and STAs 104 described herein also may communicate in other frequency bands, such as the 6.0 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, and 802.11ax standard amendments may be transmitted over the 2.4 and 5.0 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160, or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
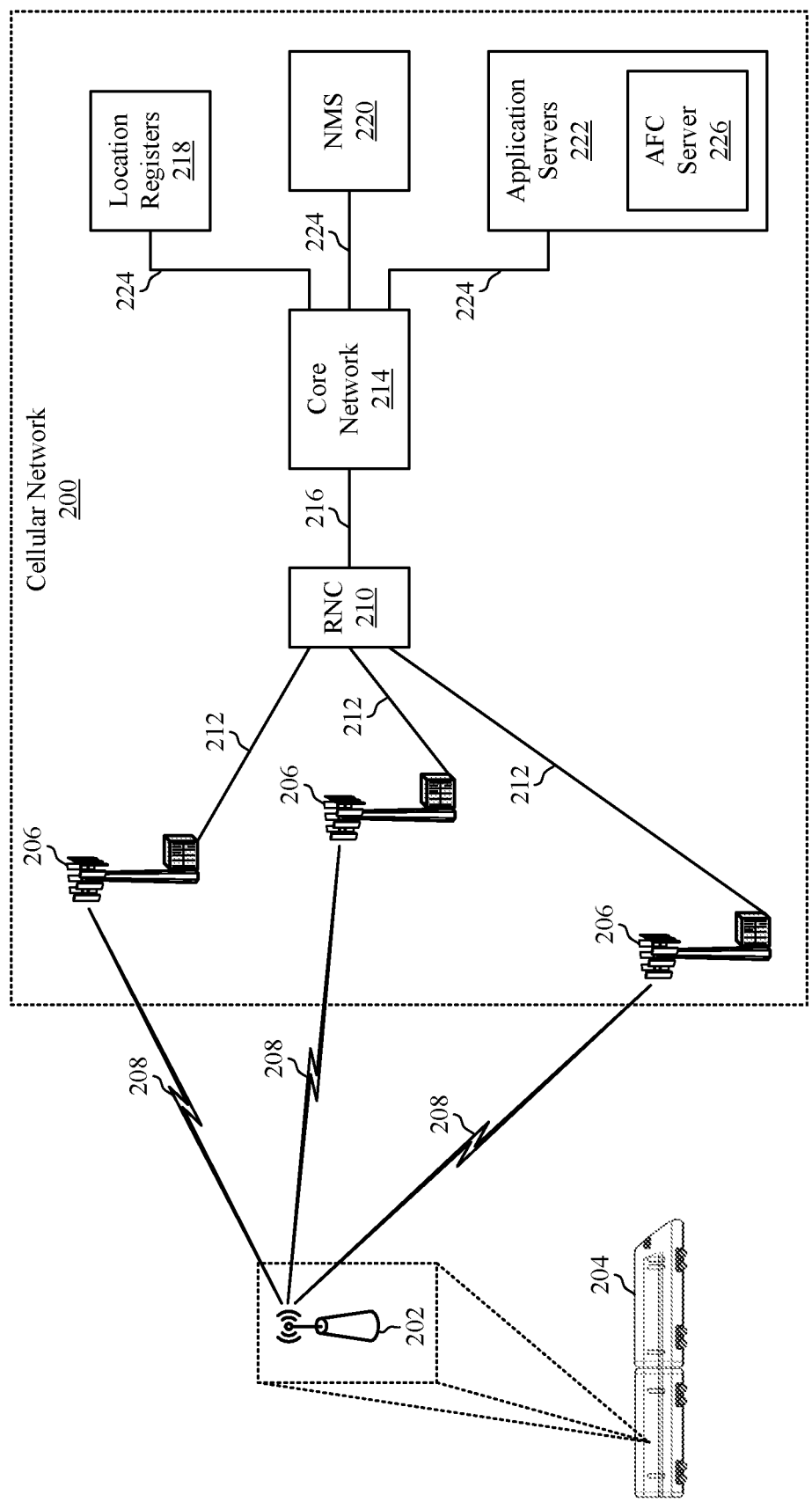
FIG. 2 shows a pictorial diagram of an example cellular network for communications with a mobile wireless communication device.

FIG. 2 shows a block diagram of an example cellular network 200 for communications with a mobile wireless communication device 202. According to some aspects, the cellular network 200 can be a network implementing at least one of the 3rd Generation Partnership Project (3GPP) family of standards (such as that defined for 3G, 4G, Long Term Evolution (LTE), or 5G-New Radio (NR)). The cellular network 200 may include numerous network entities 206 for communication between one or more client devices (also referred to as user equipment (UE)), such as the mobile wireless communication device 202 over communication links 208, and the cellular network 200. While only one wireless communication device 202 is shown, the cellular network can communicate with multiple wireless communication devices 202.

In some implementations, the wireless communication device 202 is an example implementation of the AP 102 in FIG. 1. As such, the wireless communication device 202 may be associated with a BSS or an ESS, and one or more STAs may be wirelessly coupled to the AP 102. In some implementations, the wireless communication device 202 is an example of a STA that is wirelessly coupled to an AP that communicates with the network entities 206. The wireless communication device 202 is depicted as being mobile by being included in a high speed train 204. In some other implementations, the wireless communication device 202 may be included in a car, bus, boat, or other vehicle such that the location of the wireless communication device 202 may change over time. While one wireless communication device 202 as a UE and three network entities 206 are depicted in the example in FIG. 2, any number of UEs may be communicably coupled to the cellular network 200, which may include any number of network entities 206.

The cellular network 200 is depicted as including the network entities 206, the radio network controller 210, the core network 214, the network management server 220, the one or more application servers 222, and, optionally, the location registers 218. One or more of the network entities 206 may be referred to herein as transmit-receive points (TRPs) 206. The network entities 206 may include macro cell network entities (high power cellular network entities) and/or small cell network entities (low power cellular network entities). In some implementations, the macro cell network entity may include Evolved Node Bs (eNBs) where the cellular network 200 corresponds to an LTE network, or Next Generation Node Bs (gNBs) where the cellular network 200 corresponds to a 5G network, or a combination of both, and the small cell network entities may include femtocells, picocells, microcells, etc.

In some examples, a network entity 206 (e.g., a base station) may be implemented in an aggregated (e.g., monolithic, standalone) base station architecture, which may be configured to utilize a protocol stack that is physically or logically integrated within a single network entity 206 (e.g., a single RAN node, such as a base station).

In some examples, a network entity 206 may be implemented in a disaggregated architecture (e.g., a disaggregated base station architecture, a disaggregated RAN architecture), which may be configured to utilize a protocol stack that is physically or logically distributed among two or more network entities 206, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 206 may include one or more of a central unit (CU), a distributed unit (DU), a radio unit (RU), a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. An RU may also be referred to as a radio head, a smart radio head, a remote radio head (RRH), a remote radio unit (RRU), or a transmission reception point (TRP). One or more components of the network entities 206 in a disaggregated RAN architecture may be co-located, or one or more components of the network entities 206 may be located in distributed locations (e.g., separate physical locations). In some examples, one or more network entities 206 of a disaggregated RAN architecture may be implemented as virtual units (e.g., a virtual CU (VCU), a virtual DU (VDU), a virtual RU (VRU)).

The network entities 206 may collectively form a radio access network (RAN) and interface with a core network 214 (e.g., an evolved packet core (EPC) or next generation core (NGC)) through backhaul links 212 and 216 and a radio network controller 210. In various implementations, the core network 214 is further coupled to a network management server (NMS) 220 and one or more application servers 222 over backhaul links 224. In some implementations, the core network 214 may also be coupled to location registers 218 over a backhaul link 224. In addition to other functions, the network entities 206 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. In some implementations, one or more network entities 206 may also be configured for RF sensing. The network entities 206 may communicate with each other directly or indirectly (e.g., through the EPC/NGC) over backhaul links, which may be wired or wireless, or a combination of both. Similarly, the backhaul links 212, 216, and 224 may be wired or wireless, or a combination of both.

If the cellular network 200 is to include the location registers 218, the location registers 218 may be used to store the locations of the wireless communication device 202 or other UEs coupled to the cellular network 200. For example, the wireless communication device 202 may periodically transmit its location to a network entity 206, which may be provided to the location registers 218 via the core network 214, and the wireless communication device's location may be stored into one of the location registers 218. In this manner, one or more components of the cellular network 200 may be used to track the locations of UEs over time. In some implementations, the location registers 218 are used for one or more cellular network components to assist in the AFC operations described herein. The location registers 218 may also be used for other location services such as based on a location management function (LMF).

The NMS 220 is used to manage a network associated with the wireless communication device 202. For example, an AP on the high speed train 204 may be used for a managed wireless network in the high speed train 204. In various implementations, the NMS 220 performs authorization, authentication, and accounting (AAA) for the managed network. For example, the NMS 220 may be used to enforce policies, audit usage, manage billing, or provide other services associated with the managed network.

The one or more application servers 222 may be used to provide one or more internet applications or other applications to UEs coupled to the cellular network (such as an AP communicating with the network entities 206) or to other devices communicably coupled to the application server (such as one or more STAs communicably coupled to an AP communicating with the network entities 206). For example, a streaming service may include an application server 222 for streaming media to one or more devices in the high speed train 204. In various implementations, the application servers 222 include an AFC server 226, which may include one or more servers configured to provide AFC services to one or more devices (such as the wireless communication device 202) for a defined area. The AFC server 226 stores the locations of devices communicating in the 6 GHz wireless band in the defined area (such as licensed microwave towers) and the location areas associated with the devices (such as the location of the device or the area in which the device is to communicate). The location areas may be stored in terms of geographic markers, such as latitude and longitude. For example, an AFC server 226 to service devices travelling along one or more rail lines including the high speed train 204 may store the geographic locations of microwave towers or other licensed, preconfigured, or known devices existing in the area around the one or more rail lines. The AFC server 226 also stores, for each licensed, preconfigured, or known device, what transmit power of other devices is allowed by the licensed, preconfigured, or known device. For example, the AFC server 226 may store an indication as to whether a device allows SP or LPI (or possibly only VLP) for an AP transmitting in the 6 GHz frequency. In some other examples, the AFC server 226 may store an indication of the actual transmit power allowed or another suitable indication that allows an AP to set its transmit power to an allowed power setting while in the vicinity of the licensed device. With the AFC server 226 storing the location areas for the existing devices and the transmit power levels allowed by the existing devices, the AFC server 226 is able to process an AFC request indicating a location of the wireless communication device 202 in order to identify the transmit power allowed at the indicated location and provide an AFC response indicating the allowed transmit power. In some implementations, the AFC server 226 also stores an indication of frequencies allowed by one or more of the existing devices. For example, for an existing device occupying a specific 20 MHz channel in the 6 GHz wireless band, the AFC server 226 may store an indication for the existing device that the specific 20 MHz channel is not to be used at a location corresponding to the existing device, or the AFC server 226 may store an indication of all 20 MHz channels being allowed for use other (with the list excluding the specific 20 MHZ channel).

While the location registers 218, the NMS 220, and the one or more application servers 222 are depicted as being external to the core network 214, in some implementations, one or more of the location registers 218, NMS 220, or one or more application servers 222 are included in the core network 214. Alternatively, while the location registers 218, the NMS 220, and the one or more application servers 222 are depicted as being included in the cellular network 200, one or more of the location registers 218, the NMS 220, or one or more application servers 222 may be outside of the cellular network 200. Any of the components depicted as being included in the cellular network 200 (such as the RNC 210, one or more components of the core network 214, the location registers 218, the NMS 220, or one or more application servers 222 (such as the AFC server 226) may be referred to herein as a network component or a cellular network component. Additionally, any of the components depicted in FIG. 2 (such as the wireless communication device 202, a network entity 206, the RNC 210, one or more components of the core network 214, the location registers 218, the NMS 220, or one or more application servers 222 (such as the AFC server 226)) may be referred to herein as a device. In addition, wireless communication device may refer to a device itself or at least a portion of the device (such as described below with reference to FIG. 3).

Each of the network entities 206 provide communication coverage for a respective geographic coverage area. In an aspect, one or more cells may be supported by a network entity in each coverage area. A "cell" is a logical communication entity used for communication with a network entity or UE (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a network entity (e.g., a sector), insofar as a carrier frequency can be detected and used for communication within some portion of geographic coverage areas.

While neighboring macro cell network entity geographic coverage areas may partially overlap (e.g., in a handover region), some of the geographic coverage areas may be substantially overlapped by a larger geographic coverage area. For example, a small cell network entity may have a coverage area that substantially overlaps with the coverage area of one or more macro cell network entities. A network that includes both small cell and macro cell network entities may be known as a heterogeneous network. A heterogeneous network may also include home eNBs (HeNBs), which may provide service to a restricted group known as a closed subscriber group (CSG).

The communication links between the network entities and the UEs may include UL (also referred to as reverse link) transmissions from a UE to a network entity and/or DL (also referred to as forward link) transmissions from a network entity to a UE. The communication links may use multiple-input multiple-output (MIMO) antenna technology, including spatial multiplexing, beamforming, and/or transmit diversity. The communication links may be through one or more carrier frequencies. Allocation of carriers may be asymmetric with respect to DL and UL (e.g., more or less carriers may be allocated for DL than for UL). UL and DL transmissions as described herein may be over a user plane (UP) or a control plane (CP).

Figure 3:
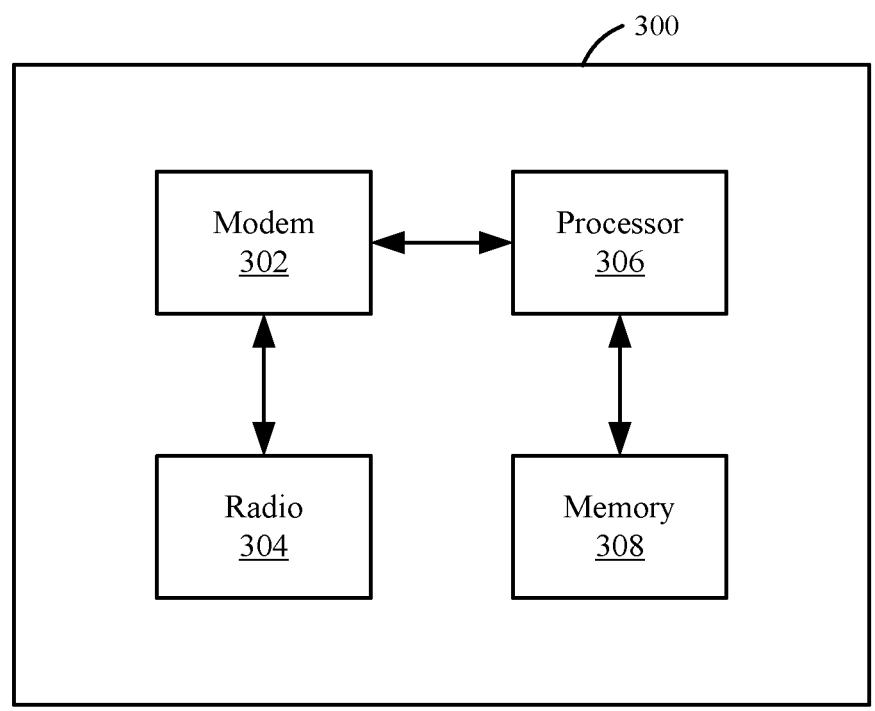
FIG. 3 shows a block diagram of an example wireless communication device.

FIG. 3 shows a block diagram of an example wireless communication device 300. In some implementations, the wireless communication device 300 can be an example of a device for use in a STA such as one of the STAs 104 described above with reference to FIG. 1. In some implementations, the wireless communication device 300 can be an example of a device for use in an AP such as the AP 102 described above with reference to FIG. 1. In some implementations, the wireless communication device 300 can be an example of a device for use in a network entity, such as the network entity 206 described above with reference to FIG. 2. The wireless communication device 300 is capable of transmitting (or outputting for transmission) and receiving wireless communications (for example, in the form of wireless packets). For example, the wireless communication device 300 can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11 ay, 802.11ax, 802.11az, 802.11ba, and 802.11be. In addition, or to the alternative, the wireless communication device 300 can be configured to transmit and receive packets conforming to one or more of the 3GPP standards, such as for 3G, 4G, or 5G, or other cellular or WWAN technologies.

The wireless communication device 300 can be, or can include, a chip, system on chip (SoC), chipset, package, or device that includes one or more modems 302, for example, a Wi-Fi (IEEE 802.11 compliant) modem. In some implementations, the one or more modems 302 (collectively "the modem 302") additionally include a WWAN modem (for example, a 3GPP 4G LTE or 5G compliant modem). In some implementations, the wireless communication device 300 also includes one or more radios 304 (collectively "the radio 404"). In some implementations, the wireless communication device 300 further includes one or more processors, processing blocks or processing elements (collectively "the processor 306"), and one or more memory blocks or elements (collectively "the memory 308").

The modem 302 can include an intelligent hardware block or device such as, for example, an application-specific integrated circuit (ASIC) among other possibilities. The modem 302 is configured to implement a PHY layer. For example, the modem 302 is configured to modulate packets and to output the modulated packets to the radio 304 for transmission over the wireless medium. The modem 302 is similarly configured to obtain modulated packets received by the radio 304 and to demodulate the packets to provide demodulated packets. In addition to a modulator and a demodulator, the modem 302 may further include digital signal processing (DSP) circuitry, automatic gain control (AGC), a coder, a decoder, a multiplexer, and a demultiplexer. For example, while in a transmission mode, data obtained from the processor 306 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and the radio 304. In implementations involving beamforming, the modulated symbols in the respective spatial streams are precoded via a steering matrix prior to their provision to the IFFT block.

While in a reception mode, digital signals received from the radio 304 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 306) for processing, evaluation, or interpretation.

The radio 304 includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 300 can include, or be coupled with, multiple transmit antennas (each with a corresponding transmit chain) and multiple receive antennas (each with a corresponding receive chain). The symbols output from the modem 302 are provided to the radio 304, which then transmits the symbols via the coupled antennas. Similarly, symbols received via the antennas are obtained by the radio 304, which then provides the symbols to the modem 302.

The processor 306 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 306 processes information received through the radio 304 and the modem 302, and processes information to be output through the modem 302 and the radio 304 for transmission through the wireless medium. For example, the processor 306 may implement a control plane and MAC layer configured to perform various operations related to the generation and transmission of MPDUs, frames, or packets. The MAC layer is configured to perform or facilitate the coding and decoding of frames, spatial multiplexing, space-time block coding (STBC), beamforming, and OFDMA resource allocation, among other operations or techniques. In some implementations, the processor 306 may control the modem 302 to cause the modem to perform various operations described above.

The memory 308 can include tangible storage media such as random-access memory (RAM) or read-only memory (ROM), or combinations thereof. The memory 308 also can store non-transitory processor- or computer-executable software (SW) code containing instructions that, when executed by the processor 306, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 4B:
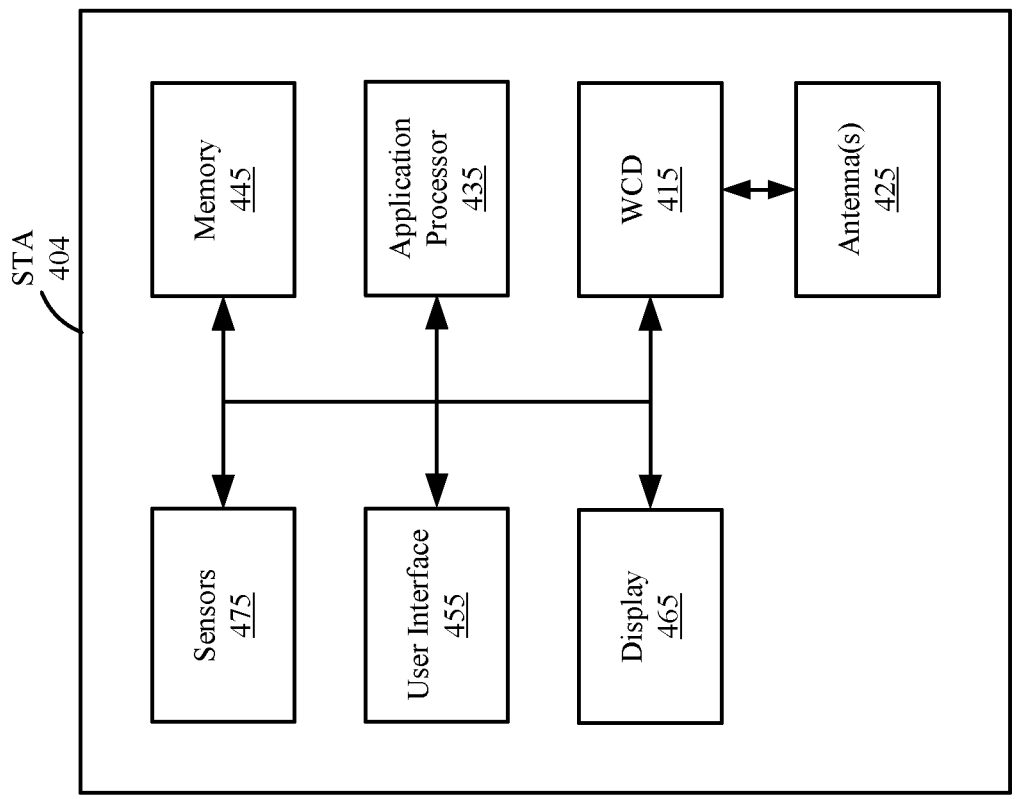
FIG. 4B shows a block diagram of an example station (STA).
Figure 4A:
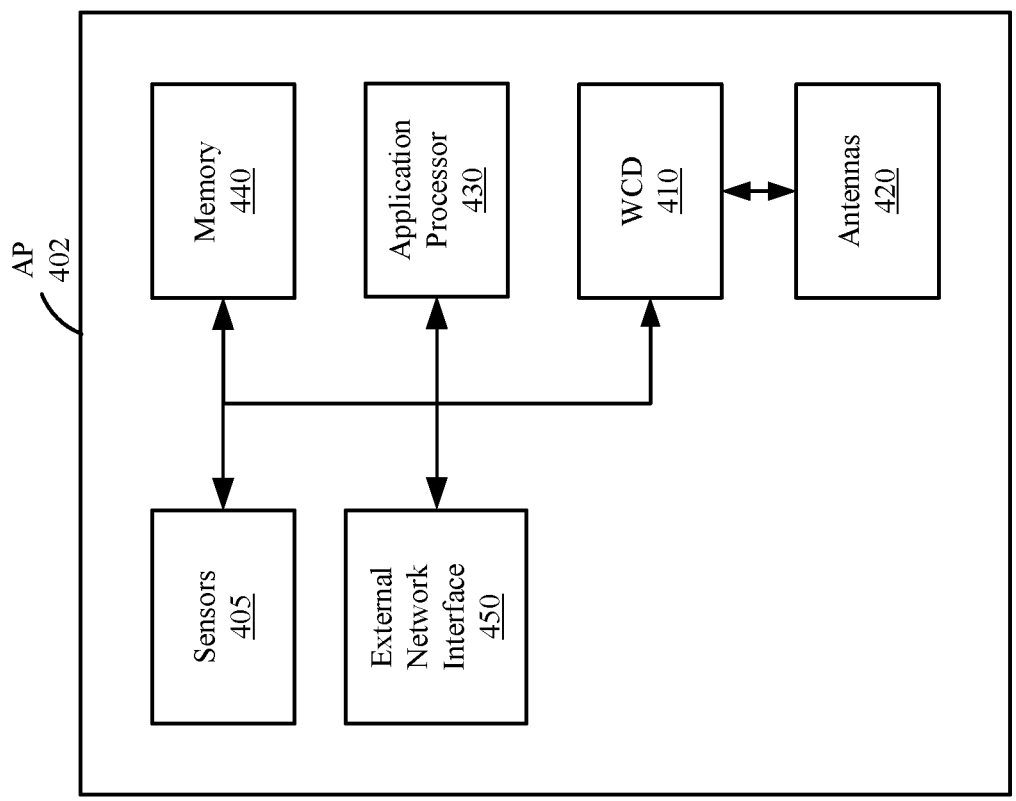
FIG. 4A shows a block diagram of an example access point (AP).

FIG. 4A shows a block diagram of an example AP 402. For example, the AP 402 can be an example implementation of the AP 102 described with reference to FIG. 1. The AP 402 includes a wireless communication device (WCD) 410. For example, the wireless communication device 410 may be an example implementation of the wireless communication device 300 described with reference to FIG. 3. The AP 402 also includes multiple antennas 420 coupled with the wireless communication device 410 to transmit and receive wireless communications. In some implementations, the AP 402 additionally includes an application processor 430 coupled with the wireless communication device 410, and a memory 440 coupled with the application processor 430. The AP 402 further includes at least one external network interface 450 that enables the AP 402 to communicate with a core network or backhaul network to gain access to external networks including the Internet. For example, the external network interface 450 may include one or both of a wired (for example, Ethernet) network interface and a wireless network interface (such as a WWAN interface). In some implementations, the external network interface 450 is configured to communicate within a cellular network, and the wireless communication device 410 (in combination with the antennas 420) is configured to communicate within a WLAN. In some other implementations, the wireless communication device 410 (in combination with the antennas 420) is configured to communicate both within a cellular network and a WLAN. The AP 402 may further include one or more sensors 405. For example, the AP 402 may include one or more of a global positioning system (GPS) receiver or other suitable global navigation satellite system (GNSS) receiver, accelerometer, magnetometer, or other suitable sensors used to determine the position of the AP 402. Ones of the aforementioned components can communicate with other ones of the components directly or indirectly, over at least one bus. The AP 402 further includes a housing that encompasses the wireless communication device 410, the application processor 430, the memory 440, and at least portions of the antennas 420 and external network interface 450. In some implementations, the housing encompasses at least portions of the sensors 405.

FIG. 4B shows a block diagram of an example STA 404. For example, the STA 404 can be an example implementation of the STA 104 described with reference to FIG. 1. The STA 404 includes a wireless communication device 415. For example, the wireless communication device 415 may be an example implementation of the wireless communication device 300 described with reference to FIG. 3. The STA 404 also includes one or more antennas 425 coupled with the wireless communication device 415 to transmit and receive wireless communications. The STA 404 additionally includes an application processor 435 coupled with the wireless communication device 415, and a memory 445 coupled with the application processor 435. In some implementations, the STA 404 further includes a user interface (UI) 455 (such as a touchscreen or keypad) and a display 465, which may be integrated with the UI 455 to form a touchscreen display. In some implementations, the STA 404 may further include one or more sensors 475 such as, for example, one or more inertial sensors, accelerometers, temperature sensors, pressure sensors, or altitude sensors. For example, the STA 404 may include a GPS receiver or other suitable GNSS receiver. Ones of the aforementioned components can communicate with other ones of the components directly or indirectly, over at least one bus. The STA 404 further includes a housing that encompasses the wireless communication device 415, the application processor 435, the memory 445, and at least portions of the antennas 425, UI 455, and display 465.

Figure 4C:
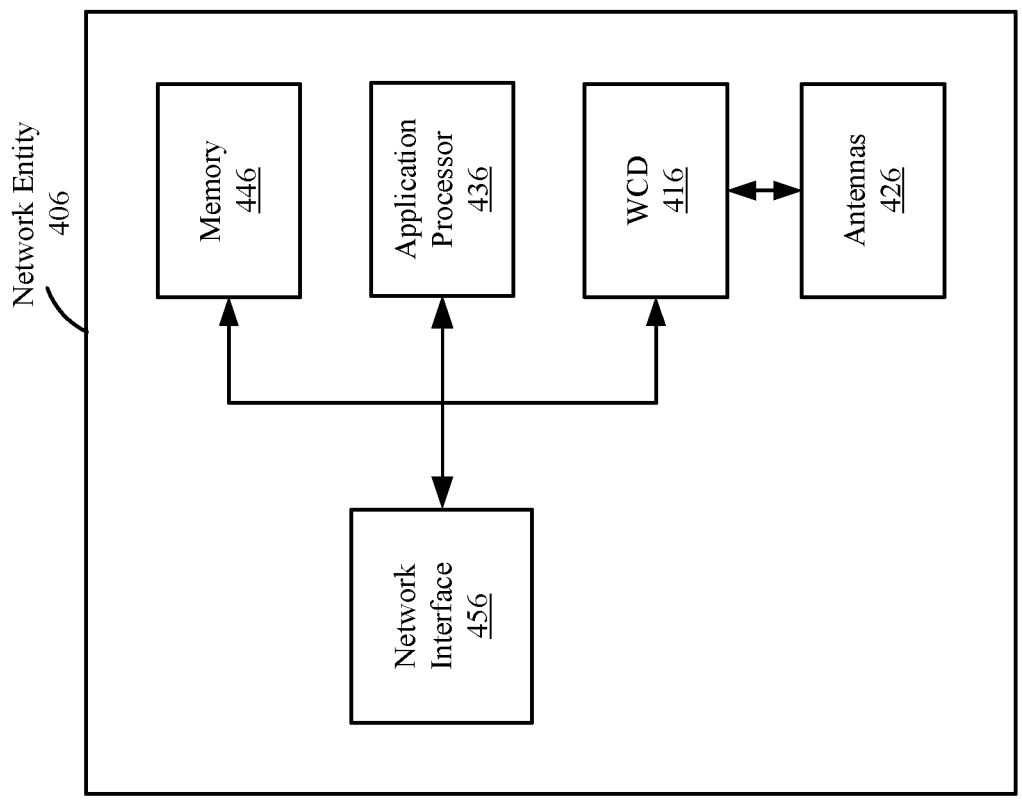
FIG. 4C shows a block diagram of an example network entity.

FIG. 4C shows a block diagram of an example network entity 406. For example, the network entity 406 can be an example implementation of the network entity 206 described with reference to FIG. 2. The network entity 406 includes a wireless communication device (WCD) 416. For example, the wireless communication device 416 may be an example implementation of the wireless communication device 300 described with reference to FIG. 3. The network entity 406 also includes multiple antennas 426 coupled with the wireless communication device 416 to transmit and receive wireless communications. In some implementations, the network entity 406 additionally includes an application processor 436 coupled with the wireless communication device 416, and a memory 446 coupled with the application processor 436. The network entity 406 further includes at least one network interface 456 that enables the network entity 406 to communicate with a core network (such as via an RCN). For example, the network interface 456 may include one or both of a wired (for example, Ethernet or fiber optic) network interface. In some implementations, the network interface 456 is configured to communicate with a core network through an RCN, and the wireless communication device 416 (in combination with the antennas 426) is configured to communicate with UEs communicably coupled to the network entity 406. In some other implementations, the wireless communication device 416 (in combination with the antennas 426) is configured to communicate both with a core network and the UEs. Ones of the aforementioned components can communicate with other ones of the components directly or indirectly, over at least one bus. The network entity 406 further includes a housing that encompasses the wireless communication device 416, the application processor 436, the memory 446, and at least portions of the antennas 426 and network interface 456.

Figure 5:
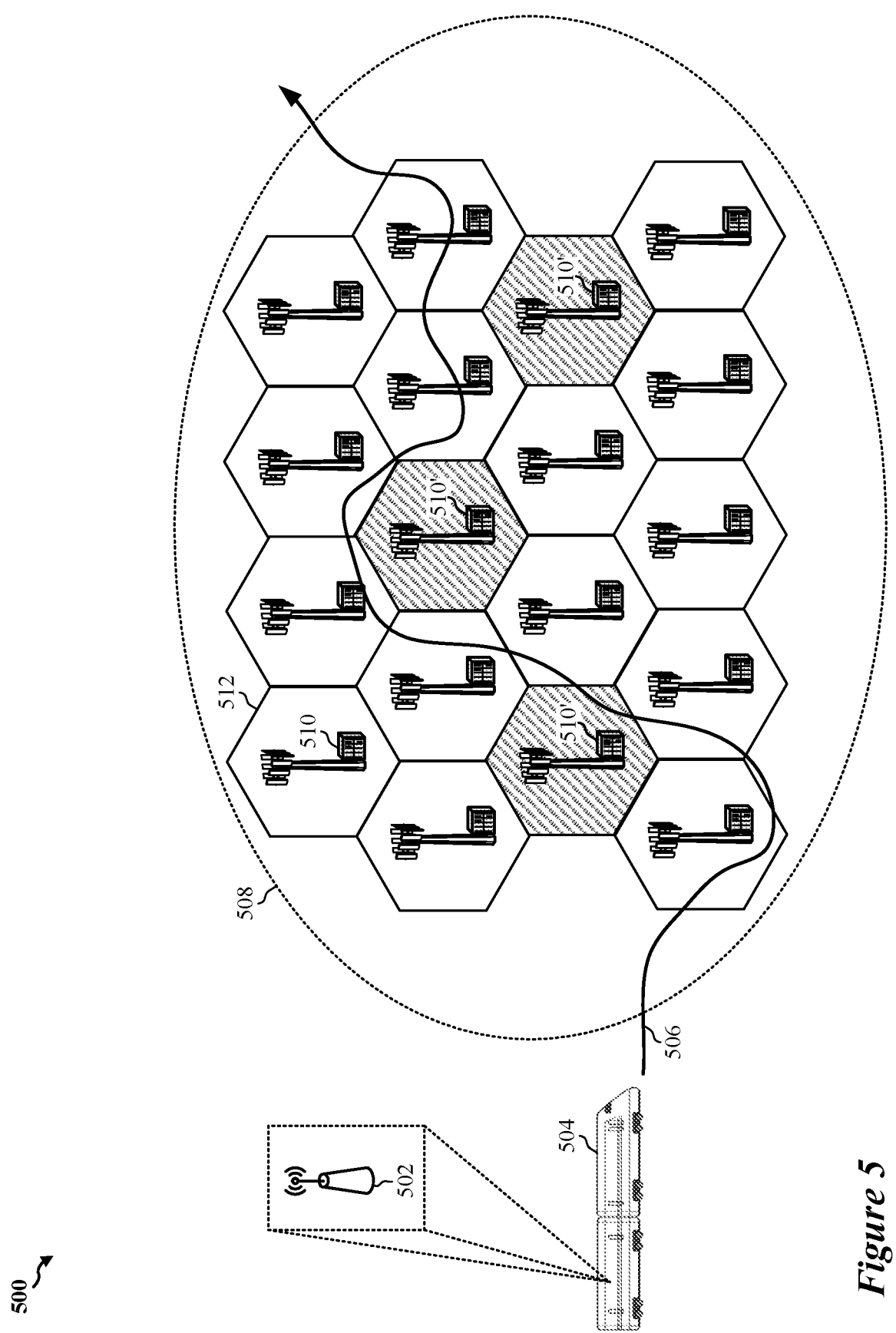
FIG. 5 shows a pictorial diagram of a wireless communication device travelling through an area for which a transmit power of the wireless communication device is to be determined.

FIG. 5 shows a pictorial diagram 500 of a wireless communication device 502 travelling through an area 508 for which a transmit power of the wireless communication device 502 is to be determined. In some implementations, the wireless communication device 502 may be an example of the wireless communication device 300. The wireless communication device 502 may be or may be included in an AP 402 or a STA 404. The wireless communication device 502 is referred to herein simply as device 502.

The device 502 (such as an AP serving STAs of a WLAN or a STA being served by an AP of the WLAN) is depicted as being included in high speed train 504, which may be an example implementation of high speed train 202. For example, the device 502 may be an AP installed in the high speed train 504 to provide internet access to passengers. In another example, the device 502 may be a STA enabled as a soft-AP (SAP) to service other devices of one or more passengers. In a further example, the device 502 is a STA serviced by an AP that is installed in the high speed train 504 or serviced by an SAP in the high speed train 504. The high speed train 504 travels along the path 506, which includes one or more rails. If the device 502 is in a vehicle other than high speed train 504 (such as a car, bus, etc.), the path 506 may include one or more roads or suitable paths of travel by the vehicle. To note, the device 502 may travel in any suitable means which may not be predefined by a path (such as by drone, by an off road vehicle, or other vehicles that do not use predefined paths). As such, a path of a device may refer to any suitable trajectory of the device, which may be known before the device travels such path or may be known only after the device travels such path.

The path 506 is depicted as winding through coverage area 508 including a plurality of network entities 510 having coverage areas 512. The unshaded coverage areas indicate those coverage areas not including or otherwise not associated with a communication device or path requiring the device 502 to transmit at a transmit power lower than SP. As such, the device 502 while traveling through those areas is allowed to transmit at SP. The shaded coverage areas associated (such as associated with network entities 510') indicate those coverage areas including or otherwise associated with a communication device or path requiring the device 502 to transmit at a transmit power lower than SP. For example, the first shaded coverage area through which the path 506 enters may include a microwave tower that requires all devices close to the tower to transmit at LPI.

Typically, as the high speed train 504 travels along path 506, the device 502 transmits AFC requests to identify what transmit power may be used for 6 GHz communications. For example, an AP or a STA may identify that it moves 500 meters (such as via a GPS receiver or based on a position indicated by a STA communicating with the AP) or a maximum amount of time has passed and transmits an AFC request to a network entity of a cellular network (such as through an AP for a STA) in order for an AFC server to generate an AFC response communicated back to the AP or STA to indicate the allowed transmit power for the AP's or STA's location. As such, each time the device 502 travels along the path 506, the device 502 transmits a plurality of AFC requests.

Since the licensed devices and other known devices (such as a device communicating in an unlicensed portion of the spectrum) for 6 GHz communications (and their respective coverage areas affected by such communications) may have static, defined locations, if a device travels frequently along the same path, AFC requests may be repeatedly transmitted for the same locations and thus lead to the same AFC responses from the AFC server. As the number of devices to transmit AFC requests travel in a same area, the number of AFC requests increasing may place a strain on the processing resources of the cellular network (such as a network entity) or the AFC server. As such, various implementations described herein are regarding learning of a device's movement pattern in order to reduce the number of AFC requests needed to set the devices' required transmit power for 6 GHz communications. FIGS. 6-9 are with reference to using an AFC request to identify the required transmit power for a plurality of nearest neighbors at different locations. The identified locations and required transmit powers of the nearest neighbors that are received over time may be used to track the movements of the device in order to be able to set the transmit power without transmitting an AFC request for locations previously queried by the device from the AFC server. FIGS. 10-22 are with reference to initially limiting the transmission of an AFC request to an AFC event (such as crossing between defined location areas, handoff between network entities, or expiration of a timer counting a predefined time between AFC requests). The AFC responses that are received over time may be used to identify locations previously travelled and the required transmit power to be used for such locations without requiring additional AFC requests to be sent.

To note, FIG. 5 depicting the required transmit power as being partitioned according to coverage area of a network entity is exclusively for clarity in explaining aspects of the present disclosure. For example, a coverage area of a network entity may include multiple licensed or known devices or location areas associated with such devices such that portions of the coverage area may be associated with one or more transmit power requirements lower than SP and other portions of the coverage area may be associated with SP being allowable. In another example, a plurality of coverage areas may be associated with a location area of a licensed or known device requiring a lower transmit power than SP.

Figure 6:
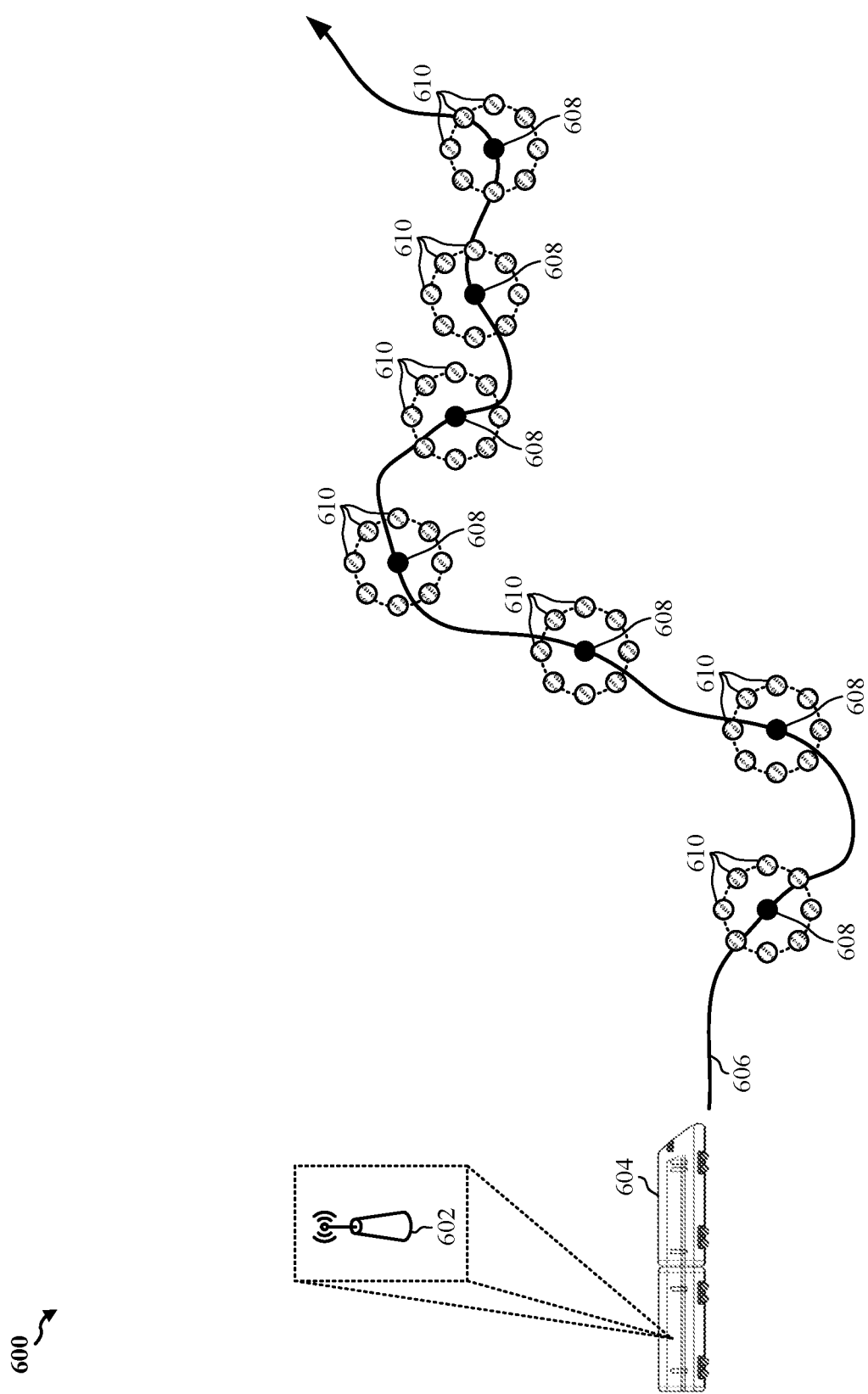
FIG. 6 shows a pictorial diagram of a wireless communication device transmitting automated frequency coordination (AFC) requests for nearest neighboring entities of the wireless communication device.

FIG. 6 shows a pictorial diagram 600 of a wireless communication device 602 transmitting AFC requests for nearest neighboring entities of the wireless communication device 602. The wireless communication device 602 may be an example implementation of the wireless communication device 502 in FIG. 5 and may be referred to simply as device 602. As depicted, the device 602 is included in a high speed train 604 (which may be an example implementation of the high speed train 504) travelling along the path 606 (which may be the same as path 506). At locations 608 along the path 606, the device 602 transmits an AFC request. Referring back to FIG. 2, in some implementations, the device 202 transmits the AFC request, which is received by a serving network entity 206. For example, an AP served by the network entity 206 may transmit the AFC request to the network entity 206. In another example, a STA communicably coupled to the AP served by the network entity 206 may transmit the AFC request to the AP, which transmits the AFC request to the network entity 206. The AFC request received by the network entity 206 is forwarded to the AFC server 226. The AFC server 226 processes the AFC request and generates an AFC response, which is transmitted through the cellular network 200 and by the serving network entity 206 to the device 202 (such as to an AP or to a STA through the AP).

In various implementations, each AFC request is associated with a number of entities at different locations for which an indication as to the allowed transmit power for that location is requested. For example, as depicted in FIG. 6, each location 608 is associated with eight entities 610 neighboring the location 608. As used herein, a nearest neighboring entity 610 may refer to one or more of a nearest neighboring device on the 6 GHz wireless band (such as may be based on an indication by the AFC server), a location defined by the device 602, a serving cell, or another suitable object with a location different than the current location 608 of the device 602. If the nearest neighboring entity is a defined location, the location of the nearest neighboring entity is the defined location itself. If the nearest neighboring entity is a known device nearest to the device 602 as determined by the AFC server 226, the location of the nearest neighboring entity is the location of the known device.

In some implementations, to enable requesting transmit power indications associated with a plurality of entities (such as for a plurality of locations defined for the device 602), the AFC request is modified to allow indicating the plurality of entities. For example, the typical AFC request includes a payload that indicates the location of the device 602 (such as a latitude and longitude of the device 602). The AFC request may be modified so that the payload may indicate a plurality of locations (such as a string of latitude and longitude coordinates). In another example, the device 602 may provide an AFC request indicating the location of the device 602, and the AFC server 226 (or another network component) may translate the location of the device 602 in the AFC request into a plurality of nearest neighboring locations to the indicated location. In a further example, the AFC server 226 may identify the nearest neighboring devices to the indicated location (such as within a defined distance from the indicated location). In some other implementations, the device 602 may increase the number of AFC requests sent, with each entity 610 being associated with a separate AFC request such that each AFC request includes a different location. For clarity in explaining aspects of the present disclosure, the examples below are regarding an AFC request indicating a plurality of locations neighboring the current location of an AP.

The number of nearest neighboring entities to be indicated by an AFC request may be defined at one or more of the device transmitting the AFC request, the AFC server, or one or more network components. For the examples provided herein, the defined number of nearest neighboring entities is K nearest neighbors (KNN) for any suitable integer K greater than or equal to one. K may be defined in any suitable manner, such as being predefined by the manufacturer or based on a standard, defined based on vendor requirements, user defined or adjusted, and so on.

If an AFC request is modified to include or otherwise indicate KNN to the device, the AFC server that processes the AFC request is configured to be able to identify the KNN from the request and generate an AFC response including an AFC power level indication for each of the KNN. If the AFC request includes the location of the device, the AFC server that processes the AFC request is configured to be able to identify KNN based on the indicated location and generate the AFC response including the AFC power level indication for each of the KNN. The AFC power level indication is any suitable indicator of the transmit power allowed at a location corresponding to the associated nearest neighboring entity. In some implementations, the AFC power level indication is a binary indication (such as a bit in the AFC response) as to whether or not SP transmit power is allowed. For example, the bit set to low or false may indicate that SP is not allowed and that a transmit power of a device in that vicinity must be less than or equal to LPI, and the bit set to high or true may indicate that SP is allowed such that the transmit power of the device may be up to the SP transmit power. In some other implementations, the AFC power level indication is a multiple bit indication to indicate one of a plurality of different AFC power levels (such as a two bit indicator indicating one of SP, LPI, or VLP). In some further implementations, the AFC power level indication indicates an actual maximum transmit power value.

In some implementations, the AFC response also includes a frequency indication of one or more frequencies that may be used. For example, the AFC response may include a frequency indication for each of the KNN to indicate the one or more frequencies that may be used for 6 GHz communications at the location associated with each of the KNN. The frequency indication may be any suitable indication. For example, the frequency indication may be a multiple bit indication to indicate which 20 MHz channels of the 6 GHz frequency spectrum are allowed or are not permitted. In some implementations, the frequency indication may indicate if a different frequency spectrum is to be used (such as whether 6 GHz or a specific frequency spectrum greater than 6 GHz is to be used).

In some implementations, the AFC response includes a VendorExtension object to indicate the AFC power level indication of the KNN. For example, if K is eight, the VendorExtension object may include eight binary indicators such as the binary indicator described above. In some implementations, the VendorExtension object also indicates the frequency (which may include one or more channels or other suitable frequency partitions) of the KNN. The VendorExtension object may be any suitable format as defined at the AFC server and receiving device. For example, the VendorExtension object may be standard or proprietary and configured to meet the needs of the vendor. The format of a VendorExtension object may vary based on the specific vendor (with the object being modified to meet each of the vendors' specific needs). In some implementations, the VendorExtension object includes an extensionID field that indicates one or more of the vendor or a field type of a payload of the specific vendor extension. For example, the extensionID field may be in a preamble of the VendorExtension object. As such, the device that receives the AFC response may process the preamble (including the extensionID field) and identify the vendor or the format of the VendorExtension object based on the indication of the vendor in the extensionID field. Based on the known format of the VendorExtension object for the vendor, the receiving device is able to successfully parse the remainder of the VendorExtension object. In some implementations, the VendorExtension object also includes a parameters field that contains the payload as defined by the known format of the specific VendorExtension object. If the extensionID field indicates a field type of the payload, the parameters field is of the indicated field type, and processing the parameters field may be based on the specific field type. For example, the field type may define the number of bits in the parameters field, and based on the known formatting of the bits for the specific field type (or based on the specific vendor) as to how the AFC power level indications are included in the parameters field, the receiving device is able to parse the parameters field to obtain the AFC power level indications. For example, the parameters field may include eight binary indicators (or other suitable indicators) of the AFC power levels of the KNN (where K equals eight) arranged in a specific format based on one or more of the field type of the parameters field or the specific vendor of the VendorExtension object. Processing the VendorExtension object includes processing the parameters field to obtain the one or more AFC power level indications included in the parameters field. If the parameters field also includes frequency indicators, the receiving device is able to parse the parameters field to obtain the frequency indicators. In this manner, processing the VendorExtension object may also include processing the parameters field to obtain the one or more frequency indicators included in the parameters field. Portions of the VendorExtension object (such as the parameters field) may be defined using any JavaScript Object Notation (JSON) primitive or structural data type.

After a receiving device (such as an AP or a STA) processes an AFC response to identify the transmit power allowed for one or more nearest neighboring entities (such as obtaining the one or more AFC power level indications included in a parameters field of a VendorExtension object of an AFC response), the receiving device may store the one or more AFC power level indications of the transmit power allowed for the one or more nearest neighboring entities (such as in a memory of the wireless communication device 300, in a memory 440 of the AP 402, or in another suitable storage of the device receiving the AFC response). If the receiving device also identifies a frequency allowed for one or more nearest neighboring entities (such as obtaining one or more frequency indicators included in a parameters field of a VendorExtension object of an AFC response), the receiving device may store the one or more frequency indicators. In some implementations, the one or more AFC power level indications (and, optionally, the one or more frequency indicators) are stored in a table. The table may identify the one or more nearest neighboring entities, a location of each of the one or more nearest neighboring entities, and the AFC power level indication of the one or more nearest neighboring entities. If an entity is a location (such as may be indicated by a latitude and a longitude), the table may store a label to differentiate the location from other locations (such as, in a simplified example, "location 1", "location 2", "location 3", etc.), the location associated with the label (such as a latitude and a longitude), and the transmit power allowed at the location (such as whether SP is allowed at the location). The table may be stored in any suitable manner. In some implementations, the table may be included in a relational database capable of presenting information as data sets in tabular form and capable of manipulating the data sets using relational operators. A Structured Query Language (SQL) may be used for querying and maintaining the database.

Table 1 below is a simplified example of a table storing ten AFC power level indications for ten different locations:

TABLE 1

| Label | Latitude | Longitude | SP Allowed? |
| --- | --- | --- | --- |
| Location 1 | 10.23 | 12.24 | Yes |
| Location 2 | 11.33 | 11.35 | No |
| Location 3 | 10.45 | 12.26 | Yes |
| Location 4 | 10.11 | 12.33 | Yes |
| Location 5 | 10.16 | 11.43 | No |
| Location 6 | 34.32 | 34.22 | Yes |
| Location 7 | 34.35 | 34.11 | No |
| Location 8 | 30.23 | 11.45 | No |
| Location 9 | 30.11 | 12.34 | Yes |
| Location 10 | 30.15 | 11.23 | Yes |

In the example in table 1, each row is associated with a different entity that is a location. For each entity, the AFC power level indication is a binary indicator as to whether the SP transmit power is allowed, and the location is indicated in latitude and longitude coordinates. While not depicted in table 1, the table may also include a frequency indicator, which may be an additional column to table 1. For example, the additional column may indicate one or more specific 20 MHz channels allowed for each of the locations.

The table including the AFC power level indications may be updated and maintained in any suitable manner. In some implementations, each time an AFC power level indication associated with a new location is received, the AFC power level indication and the location may be stored in the table. In some implementations, entries that are stale (such as existing in the table for a defined amount of time) may be removed from the table. In addition, or to the alternative, entries may be removed from the table based on the amount of memory allocated for the table. For example, as the table runs out of allocated space, the oldest entry in the table may be removed. Alternatively, the least accessed entry in the table may be removed. While some examples are provided, the table may be maintained in any suitable manner based on any suitable parameter (such as defined by the vendor or a manufacturer).

As the table grows over time with new entries, the device may use the table to identify a transmit power without the use of a new AFC request. For example, when to transmit an AFC request may be based on the countdown of a time by a timer in the device. Once the timer reaches zero, the device may obtain its current location and compare its current location to the locations stored in the table. If the current location equals one of the current locations, the AFC power level indication stored for the location in the table may be used to set the transmit power for the device. A current location equaling a stored location may refer to the current location being within a tolerance of the stored location (such as within 100 meters or another suitable distance between the locations). In using the stored AFC power level indication, the device may prevent transmitting an AFC request. The timer may be reset and again countdown until the time that a new AFC request may be sent. To note, any suitable time may be used. For example, the timer may be set to a random value so that the time between AFC requests is random. If the device travels along the same routes (such as in a high speed train repeatedly travelling between two locations), the table stores the locations and AFC power level indications along those routes such that the likelihood increases that the current location of the device matches one of the stored locations in the table. In some implementations, if the table also includes frequency indicators, the table may also be used to identify a frequency, and the device may set its transmit frequency.

A minimum number of AFC requests may be required (such as by government requirements, a standard requirement, or a vendor requirement). In some implementations, the device tracks one or more of the number of AFC requests transmitted over a period of time, a time interval between AFC requests, or a time since the last AFC request was transmitted. In this manner, the device may transmit an AFC request even if the current location matches a stored location in the table to ensure that the required minimum number of AFC requests are transmitted.

In addition, or alternative to, the example of the device identifying a transmit power to be used based on a matching location in the table, the device may learn a region of mobility that may include the device (such as different portions of the paths of the high speed train) associated with different transmit power requirements based on the table entries. In this manner, the device may learn the specific regions associated with different power levels based on the entries in the table. For example, the device may cluster entries in the table based on locations and similar AFC power level indications to generate geofences to define the different regions. If the specific regions associated with different power levels are known, the device may switch transmit powers faster. For example, the device may track that it is entering a first region requiring the use of LPI and switch to the LPI transmit power without first requiring the transmission of an AFC request and processing of an AFC response. To note, any suitable means for generating the regions of mobility may be used, such as a clustering algorithm or a machine learning model trained to generate the regions of mobility. The regions of mobility may be updated based on any new entries to the table for new AFC responses received by the device.

In some other implementations of identifying the transmit power without using another AFC request, the device may be configured to predict an AFC power level indication for the device's location based on the information in the table without transmitting an AFC request. For example, a machine learning model (or another suitable model) may be trained using the locations and AFC power level indications from past AFC responses and stored in the table to predict an AFC power level indication for the current location of the device. The machine learning model may be based on, e.g., one or more of decision trees, random forests, logistic regression, nearest neighbors, classification trees, control flow graphs, support vector machines, naïve Bayes, Bayesian Networks, value sets, hidden Markov models, or neural networks configured to predict an AFC power level indication (or another suitable indication of the transmit power to be used). For example, a logistic regression model may be trained using the locations and AFC power level indications in the table. The trained logistic regression model may then be used to predict the AFC power level indication for the device's current location. After a plurality of new entries are added to the table, the logistic regression model may be updated or retrained based on the new entries in the table. In another example, the logistic regression model may be a statistical model used to predict a transmit power based on the locations and AFC power level indications in the table. As used herein, a logistic regression model may refer to a machine learning model or a statistical model.

If the table includes frequency indicators, any of the above examples of identifying a transmit power may also be used to identify a transmit frequency. For example, the transmit frequency may be based on a frequency indicator for a stored location in the table matching the current location of the device. In another example, the transmit frequency may be based on a machine learning model, statistical model, or another suitable model trained to predict the transmit frequency.

Any of the device components used to identify the AFC power level indication or the device's transmit power without the transmission of another AFC request may be implemented in hardware, software, or a combination of both in the device. If the device also identifies a frequency to be used, any of the device components used to identify the transmit frequency without the transmission of another AFC request may be implemented in hardware, software, or a combination of both in the device. For example, a clustering model to generate regions of mobility, a machine learning model to predict an AFC power level indication, or logic to match a current location to a stored location in the table may be embodied in software stored in memory 440 of the AP 402, memory 308 of the wireless communication device 300, or another suitable device storage and executed by the application processor 430 of the AP 402, processor 306 of the wireless communication device 300, or another suitable device processor.

In the above examples, a device transmits a first number of AFC requests during a first instance of travelling (e.g., travelling along a path of a train or a car or travelling along another suitable trajectory). The device then transmits a second number of AFC requests less than the first number of AFC requests during one or more successive instances after the first instance of travelling (e.g., travelling along the same path as the first instance or travelling near the locations of the path of the first instance). As noted, the second number of AFC requests is based at least in part on setting the transmit power to one of the one or more AFC power level indications stored by the device independent of transmitting another AFC request. For example, the first number of AFC requests may be transmitted the first time a path is travelled, and the second, smaller number of AFC requests may be transmitted the second time, the eighth time, or another later time the path (or a similarly located path) is travelled. In this manner, the number of AFC requests and responses is reduced over time. As used herein, a device travelling multiple instances along a path may refer to the device travelling along the same path (e.g., in a train or in a car following the same path) or may refer to the device travelling along one or more paths with similar locations (e.g., travelling one street parallel to an original path in a city, travelling offroad near a road of an original path, travelling along a road neighboring a train tracks of an original path, etc.).

To prevent sparsity of data from causing errors, the device may be configured to transmit AFC requests and process the associated AFC responses for an initial amount of time until the table includes a sufficient number of entries. For example, if a high speed train travels between two locations five times a day, an AP or a STA in the high speed train may be configured to transmit AFC requests without reference to whether its current location matches a stored location in the table for 48 hours. In this manner, the high speed train traverses the same path ten times (with the AP or STA transmitting AFC requests, receiving AFC responses, and filling entries into a table including the AFC power levels) before the AP or STA attempts to reduce the number of AFC requests transmitted during the train's traversal between the locations. The initial amount of time may be any suitable amount of time, which may be defined by the manufacturer, the vendor, user adjusted, and so on.

Figure 7:
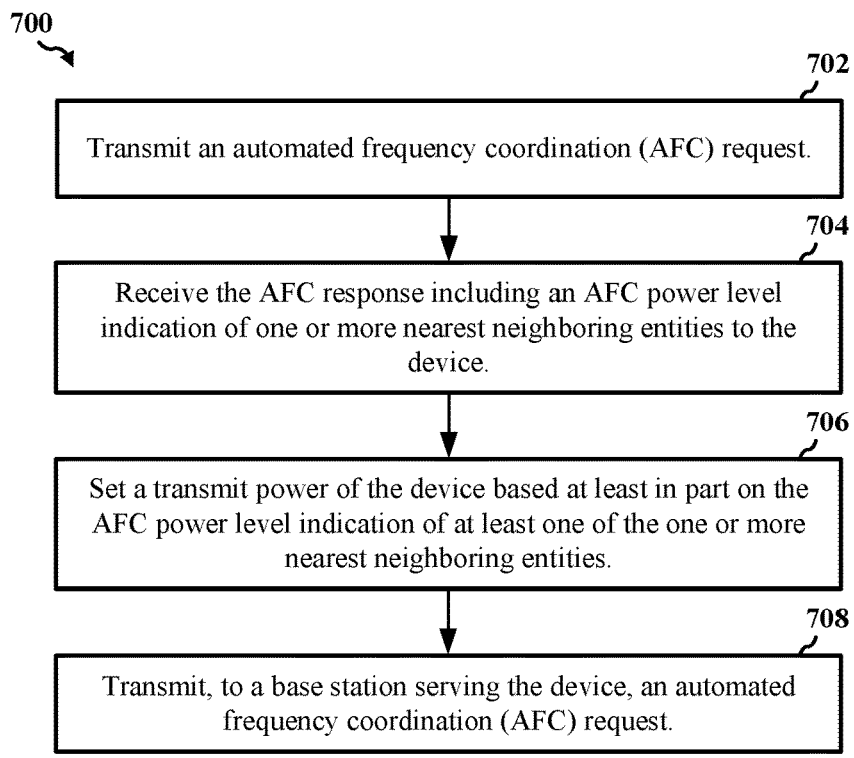
FIGS. 7-9 show flowcharts illustrating example operations for wireless communication that supports AFC requests for nearest neighboring entities of a wireless communication device to control its transmit power, according to some implementations.

FIG. 7 shows a flowchart illustrating an example operation 700 for wireless communication that supports AFC requests for nearest neighboring entities of a wireless communication device to control its transmit power, according to some implementations. The operation 700 may be performed by any suitable device such as the wireless communication device 300 described above with reference to FIG. 3. In some instances, the operation 700 may be performed by a device operating as or within an AP, such as the AP 102 of FIG. 1, the wireless communication device 300 of FIG. 3, or the AP 402 of FIG. 4A. In some other instances, the operation 700 may be performed by another suitable device, such as the STA 404 of FIG. 4B, which may be an SAP (which may also be referred to as an AP) or may be serviced by an AP.

At 702, the device transmits an AFC request. For example, an AP may transmit an AFC request to a network entity serving the AP. In another example, a STA may transmit an AFC request to an AP, and the AP may transmit the AFC request to the network entity. In some implementations, the AFC request includes the current location of the device and one or more locations neighboring the current location (such as KNN for any suitable integer K). In this manner, the AFC server that receives the AFC request through the network entity identifies the transmit power allowed for each of the indicated locations. The device may determine the K neighboring locations based on a circle, an ellipse, a polygon, or another defined shaped around or otherwise associated with the current location. For example, the current location may be the center of a defined sized circle, and the neighboring entities are defined as specific locations on the perimeter of the circle (such as being defined as an offset in latitude and longitude from the current location). In some other implementations, the AFC request may be a typical AFC request including the current location of the device. The AFC server processing the request may be configured to generate the K neighboring locations based on the current location (such as similar to as described above) and generate the K AFC power level indications for the K neighboring locations (as well as an AFC power level indication for the current location of the device). For the above implementations, the AFC response may be the same by including K AFC power level indications for the K neighboring locations. For example, a legacy portion of the AFC response may include the AFC power level indication for the current location of the device, and a VendorExtension object of the AFC response may include the K AFC power level indications for the K neighboring locations.

At 704, the device receives an AFC response, the AFC response including an AFC power level indication of one or more nearest neighboring entities to the device. For example, the AFC response travels through a core network, an RNC, and a serving network entity of a cellular network to the device (such as to an AP or to a STA through the AP). As noted above, in some implementations, the AFC response includes a VendorExtension object to include an AFC power level indication of the one or more nearest neighboring entities (such as one or more defined locations neighboring the current location of the device). Also as noted above, in some implementations, the one or more AFC power level indications may be stored in a table identifying the one or more nearest neighboring entities, a location of each of the one or more nearest neighboring entities, and the AFC power level indication of the one or more nearest neighboring entities. Also as noted above, in some implementations, the AFC power level indication is a binary indication as to whether or not an SP transmit power is allowed. Alternatively, the AFC power level indication may indicate one of three or more different transmit powers or a specific transmit power value.

At 706, the device sets a transmit power of the device based at least in part on the AFC power level indication of at least one of the one or more nearest neighboring entities. For example, over time, the device obtains the AFC power level indications and associated locations in AFC responses and stores the AFC power level indication and locations in a table. As the density of AFC power level indications across the locations increases, the device may generate regions of mobility to indicate regions in which a specific maximum transmit power is allowed (such as whether or not SP is allowed). In this manner, as the device crosses into a region, the device may set its transmit power to the maximum transmit power associated with the region. For example, the device may alternate between SP and LPI when travelling in and out of different regions of mobility. In another example, the device may determine that its current location matches a location stored in the table (which is associated with a previously transmitted AFC request), and the device may set its transmit power to the maximum transmit power indicated by the AFC power level indication stored in the table for the matching location. At 708, the device transmits at the transmit power. For example, an AP in a high speed train may set its transmit power to LPI based on previously received AFC power level indications in a table stored at the AP, and the AP may transmit to one or more STAs of its BSS in the 6 GHz band using the set transmit power. In using previously received AFC power level indications to set the transmit power, a device may reduce the number of AFC requests transmitted over time.

In some implementations, the AFC response may also include a frequency indicator to indicate one or more permissible frequencies. For example, the frequency indicator may indicate one or more channels to be used, or the frequency indicator may indicate a specific frequency band to be used. The device may also store the frequency indicators in the table. Over time, the device obtains the frequency indicators and associated locations in AFC responses and stores the frequency indicators and locations in the table. For example, the table may include an additional column to store the frequency indicator associated with a location. As the density of frequency indicators across the locations increases, the regions of mobility that may be calculated may also indicate a frequency to be used for transmission. In another example, the device may match a stored location to a current location and use a frequency indicated in the table for the stored location.

Figure 8:
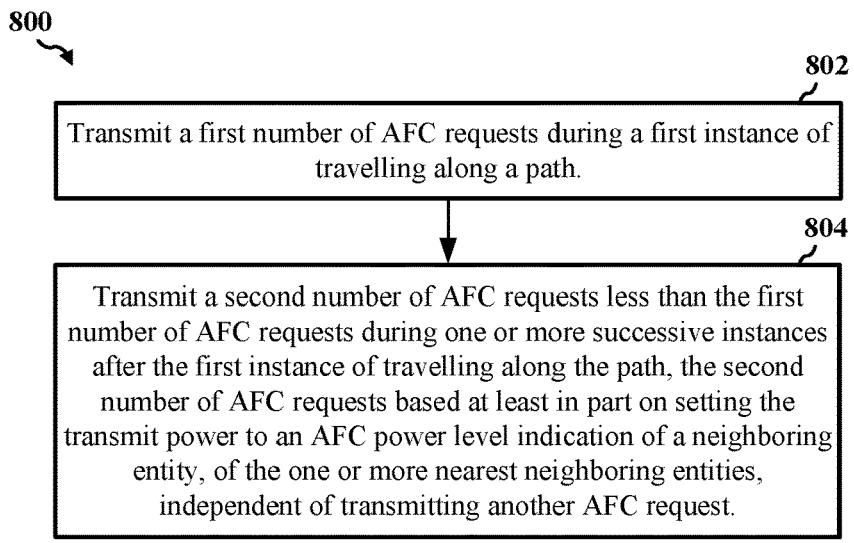

FIG. 8 shows a flowchart illustrating an example operation 800 for wireless communication that supports AFC requests for nearest neighboring entities of a wireless communication device to control its transmit power, according to some implementations. The operation 800 may be in addition to the operation 700. The operation 800 indicates that the number of AFC requests that are transmitted reduces over time.

For example, at 802, the device transmits a first number of AFC requests during a first instance of travelling along a path. At 804, the device transmits a second number of AFC requests less than the first number of AFC requests during one or more successive instances after the first instance of travelling along the path. The second number of AFC requests is based at least in part on setting the transmit power to an AFC power level indication of a neighboring entity, of the one or more nearest neighboring entities, independent of transmitting another AFC request. For example, if the current location matches a stored location in a table, the device sets the transmit power to the power level indicated by the associated AFC power level indication stored in the table. In another example, if the current location indicates that the device is moving in or out of a region of mobility associated with a specific transmit power, the device sets the transmit power to as specified. In both examples, the transmit power is set without requiring another AFC request. In this manner, the number of AFC requests is reduced over time.

Figure 9:
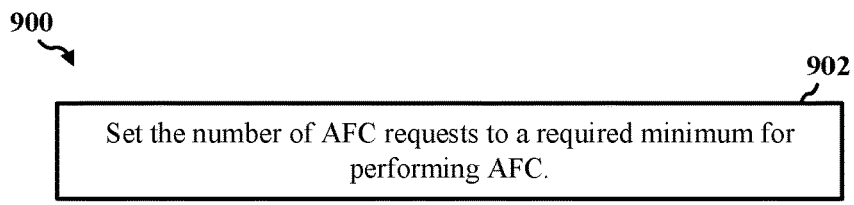

FIG. 9 shows a flowchart illustrating an example operation 900 for wireless communication that supports AFC requests for nearest neighboring entities of a wireless communication device to control its transmit power, according to some implementations. The operation 900 may be in addition to the operations 700 and 800. The operation 900 indicates that a minimum number of AFC requests may be required to be transmitted. For example, at 902, the device sets the number of AFC requests to a required minimum for performing AFC. In some implementations, the number of AFC requests transmitted may be reduced over time (such as described herein) until the number of AFC requests reaches the required minimum number. A government agency, a standard, a vendor, or another suitable entity may indicate a required minimum number of AFC requests to be transmitted over a period of time in order to perform AFC. The minimum number may be to ensure that the device does not use stale or erroneous data (such as before the launch of a new device communicating in the 6 GHz wireless band) to cause interference or other issues. In this manner, while the number of AFC requests may be reduced, the AFC requests may not be completely eliminated for performing AFC. To note, if any conflicts exist between an AFC power level indication in a new AFC response and an AFC power level indication stored in the table, the table may be updated with the received AFC power level indication.

In the example implementations above regarding nearest neighboring entities, reduction in the number of AFC requests is based on implementation of a modified AFC response including AFC power level indications for one or more neighboring locations to the current location of a device. Based on the use of such AFC responses, over time, the device is able to reduce the number of AFC requests transmitted. In some other implementations, reducing the number of AFC requests may be associated with basing the transmission of AFC requests to being triggered by the occurrence of specific AFC events associated with when an AFC request is to be transmitted. Reduction of the number of AFC requests may be further associated with learning the location pattern of the device over time in order to identify when to switch transmit powers (and, optionally, transmit frequencies).

In some implementations, an AFC event includes the device crossing a cellular based location border. A cellular based location border is a border of a location area defined within a coverage area of a cellular network. For example, a network entity transmits over one or more frequencies, and a cell may refer to a geographic area covered by a frequency emitted by the network entity. As such, a network entity may be associated with one or more cells. In some implementations, a cellular based location area is the geographic area of the cell, with the geographic border of the cell being the cellular based location border. A device (which may be the UE (such as an AP) or the network entity) may monitor the communications between the UE and the network entity to identify when the UE crosses between cells (such as based on a change in frequency used for communications), and an AFC request may be transmitted based on the UE crossing between cells.

Figure 10:
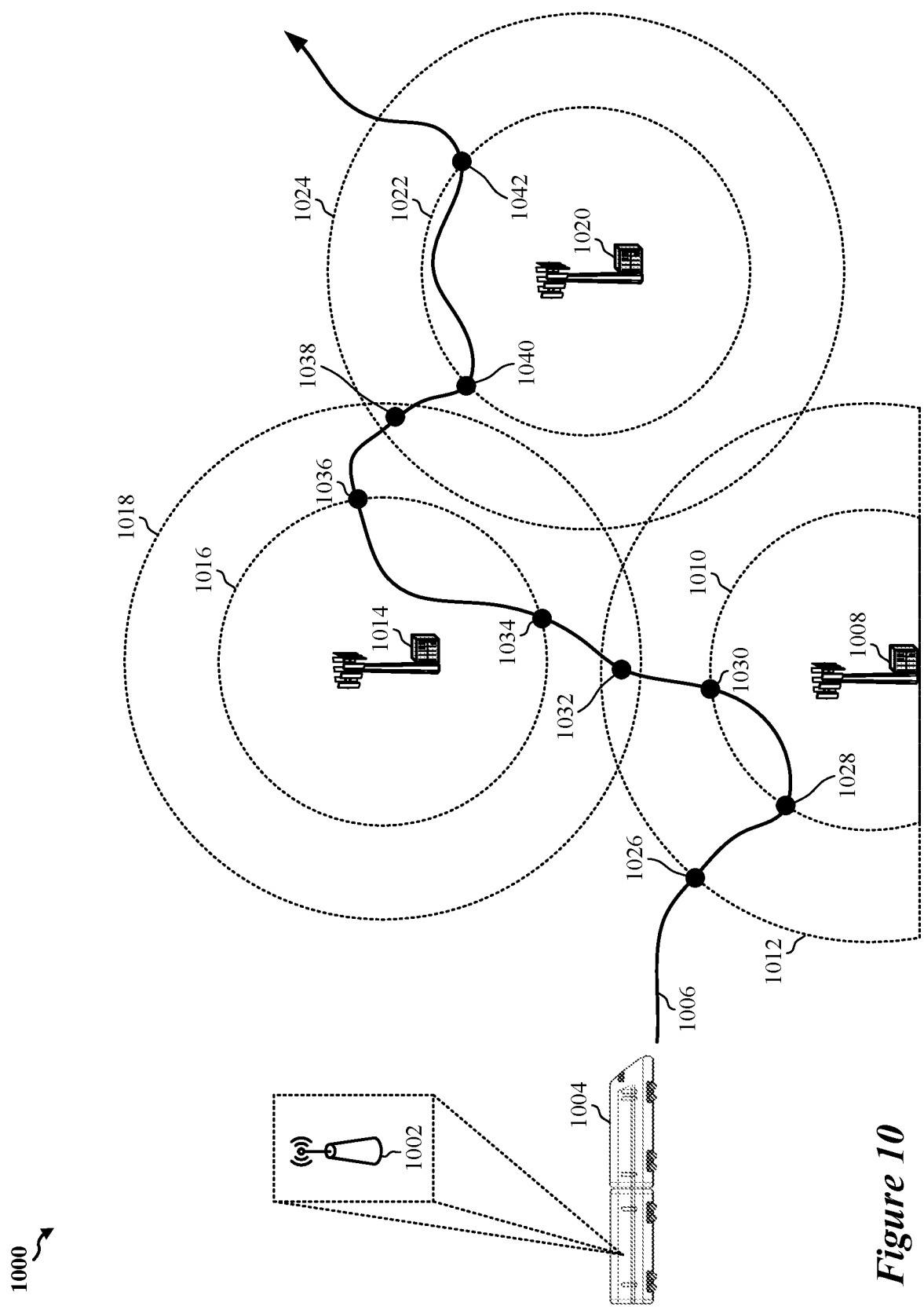
FIG. 10 shows a pictorial diagram of a wireless communication device transmitting AFC requests based on crossing defined location areas.

FIG. 10 shows a pictorial diagram 1000 of a wireless communication device 1002 transmitting AFC requests based on crossing defined location areas. The wireless communication device 1002 may be an example implementation of the wireless communication device 502 in FIG. 5 and may be referred to simply as device 1002. As depicted, the device 1002 is included in a high speed train 1004 (which may be an example implementation of the high speed train 504) travelling along the path 1006 (which may be the same as path 506). At locations 1026-1042 along the path 1006, the device 1002 transmits an AFC request. The device 1002 transmits the AFC request to a network entity (such as network entity 1008, 1014, or 1020). For example, if the device 1002 is an AP, the AP transmits the AFC request to the network entity currently serving the AP. If the device 1002 is a STA, the STA transmits the AFC request to an AP, which transmits the AFC request to the network entity currently serving the AP. The AFC request received by the network entity is forwarded to the AFC server. The AFC server processes the AFC request and generates an AFC response, which is transmitted through the cellular network and by the serving network entity to the device 1002.

As depicted, each network entity is associated with two location areas. For example, network entity 1008 is associated with a location area 1010 and a location area 1012, network entity 1014 is associated with a location area 1016 and a location area 1018, and network entity 1020 is associated with a location area 1022 and a location area 1022. While two location areas are depicted for each network entity for clarity, each network entity may be associated with any number of location areas (such as one or three or more location areas). In addition, while the location areas are depicted as concentric circles around a network entity, a location area may be any suitable shape. For example, a concentric circle may indicate that communications are omnidirectional from a network entity for a specific frequency, and a smaller concentric circle may indicate a higher frequency being used, which may cover a smaller geographic area than a lower frequency associated with a larger concentric circle. In some other examples, a location area may be an ellipse or an elongated area based on, e.g., the directionality of one or more antennas at the network entity.

The locations 1026-1042 along the path 1006 at which an AFC request is transmitted are locations associated with the cellular based location borders. For example, location 1026 is associated with the device 1002 entering the location area 1012, location 1028 is associated with the device 1002 entering the location area 1010, and location 1030 is associated with the device 1002 exiting the location area 1010. Once the device 1002 enters into the location area 1012, the network entity 1008 may communicate with the device 1002 over a frequency associated with the location area 1012. As such, crossing into the location area 1012 may be identified based on the frequency of communications between the network entity 1008 and the device 1002. Once the device 1002 enters into the location area 1010, the network entity 1008 may switch from communicating with the device 1002 over the frequency associated with the location area 1012 to a frequency associated with the location area 1010. As such, crossing into the location area 1010 may be identified based on the switch in frequencies of communications between the network entity 1008 and the device 1002. Once the device 1002 exits the location area 1010, the network entity 1008 may switch back from communicating with the device 1002 over the frequency associated with the location area 1010 to the frequency associated with the location area 1012. As such, exiting the location area 1010 may be identified based on the switch in frequencies of communications between the network entity 1008 and the device 1002.

Location 1032 may be associated with a handoff between the network entity 1008 serving the device 1002 to the network entity 1014 serving the device 1002. As used herein, the network entity serving the device refers to a network entity serving an AP, and the device may be the AP itself or a STA communicably coupled to the AP (such as being part of the AP's BSS). The frequency used to communicate with the device 1002 may change such that the device 1002 may be considered to have entered the location area 1018 associated with the currently serving network entity 1014 or to have exited the location area 1012 associated with the previously serving network entity 1008. Similar to as described above with reference to locations 1028, 1030, and 1032, location 1034 may be associated with the device 1002 entering location area 1016, location 1036 may be associated with the device 1002 exiting location area 1016, location 1038 may be associated with the device 1002 entering location area 1024 or exiting location area 1018 (such as based on a handoff between network entities 1014 and 1020), location 1040 may be associated with the device 1002 entering location area 1022, and location 1042 may be associated with the device 1002 exiting location area 1022.

Each AFC request transmitted at locations 1026-1042 may be a typical AFC request indicating the location of the device 1002, and each AFC response may be a typical AFC response including an AFC power level indication for the location of the device 1002. The information from the AFC responses may be stored in a table (such as similar to the example Table 1 above), and the information stored in the table (such as the stored locations and AFC power level indications and, optionally, frequency indicators) may be used to learn a location pattern of the device 1002 (which may include when or where to switch transmit power for transmissions in the 6 GHz wireless band and, optionally, the frequency to be used in the 6 GHz wireless band). For example, a machine learning model (or another suitable model) may be trained using the locations and AFC power level indications from past AFC responses and stored in the table to learn a location pattern of the device 1002. The machine learning model may be based on, e.g., one or more of decision trees, random forests, logistic regression, nearest neighbors, classification trees, control flow graphs, support vector machines, naïve Bayes, Bayesian Networks, value sets, hidden Markov models, or neural networks. For example, a logistic regression model may be trained using the locations and AFC power level indications in the table to learn the location pattern of the device 1002. In another example, a logistic regression model may be a statistical model used to indicate the location pattern of the device.

In addition or alternative to an AFC event including a device (such as an AP) crossing a cellular based location border, in some implementations, an AFC event includes a handoff of the device between network entities. In some examples, to determine when to transmit an AFC request, the communications between the device and the network entities may be observed (such as to see when the serving base station identify code (BSIC) changes). In some other examples, the device may be capable of indicating its location, with the coverage areas of the network entities being known. The location of the device (such as an AP or STA) crossing between coverage areas may be observed to determine when to transmit an AFC request. Based on a handoff from a current network entity to a new network entity for serving the device being identified based on the communications between the device and the network entities, an AFC request may be generated and transmitted for the device's current location.

Figure 11:
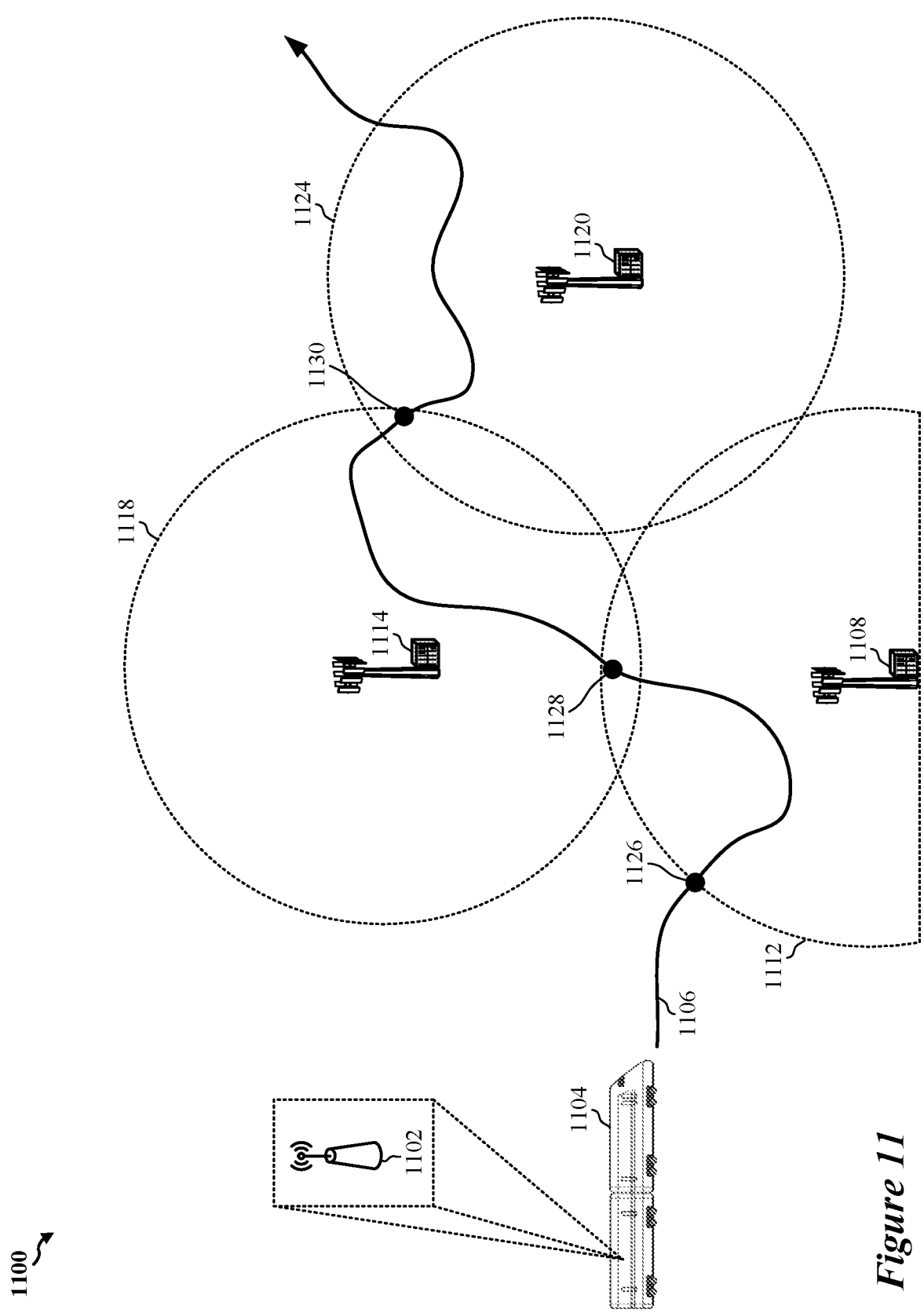
FIG. 11 shows a pictorial diagram of a wireless communication device transmitting AFC requests based on handoffs between network entities.

FIG. 11 shows a pictorial diagram 1100 of a wireless communication device 1102 transmitting AFC requests based on handoffs between network entities. The wireless communication device 1102 may be an example implementation of the wireless communication device 502 in FIG. 5 and may be referred to simply as device 1102. For example, as noted above, the device 1102 may an AP, or the device 1102 may be a STA communicably coupled to the AP. As depicted, the device 1102 is included in a high speed train 1104 (which may be an example implementation of the high speed train 504) travelling along the path 1106 (which may be the same as path 506). At locations 1126-1130 along the path 1106, the device 1102 transmits an AFC request. The device 1102 transmits the AFC request to a network entity currently serving the device 1102 (such as network entity 1108, 1114, or 1120), such as an AP transmitting the AFC request to the network entity or a STA transmitting the AFC request to the AP, with transmits the AFC request to the network entity. The AFC request received by the network entity is forwarded to the AFC server. The AFC server processes the AFC request and generates an AFC response, which is transmitted through the cellular network and by the serving network entity to the device 1102.

As depicted, network entity 1108 has a coverage area 1112, network entity 1114 has a coverage area 1118, and network entity 1120 has a coverage area 1124. Location 1126 along path 1106 is associated with the device 1102 beginning to be served by network entity 1108 (such as based on a handoff from a previously serving network entity not depicted in FIG. 11). Location 1128 along path 1106 is associated with handoff of the device 1102 from the network entity 1108 to the network entity 1114, and location 1130 along path 1106 is associated with handoff of the device 1102 from the network entity 1114 to the network entity 1120. The AFC requests transmitted at locations 1126-1130 may be typical AFC requests including the current location of the device 1102, and the AFC response may be typical AFC responses including the AFC power level indication for the location of the device 1102. Similar to as described above with reference to FIG. 10, the information from the AFC responses may be stored in a table (such as similar to the example Table 1 above), and the information stored in the table (such as the stored locations and AFC power level indications and, optionally, frequency indicators) may be used to learn a location pattern of the device 1102 (which may include when or where to switch transmit power for transmissions in the 6 GHz wireless band and, optionally, the frequency to be used in the 6 GHz wireless band).

In addition or alternative to an AFC event including a device crossing a cellular based location border or including a handoff of the device between network entities, in some implementations, an AFC event includes an AFC associated timer indicating an AFC request is to be sent. For example, an AP 402 may include a timer to count an amount of time until a next AFC request is to be generated. In another example, a STA 404 may include a timer to count an amount of time until a next AFC request is to be generated. The timer may be set to count any suitable amount of time. For example, the timer may be set to a random amount of time bounded by a maximum and a minimum amount of time. In another example, the timer may be set to a predefined amount of time that is the same each instance. In yet another example, the timer may be set to a predefined amount of time plus or minus a random difference so that the actual amount of time counted by the timer may differ. When the timer counts down to zero, an AFC request may be transmitted, and the timer may be reset to an amount of time to be counted before a next AFC request is to be transmitted. An advantage of using a timer is that if a cellular based location area is unknown or is particularly large, or if a network entity's coverage area is particularly large such that an AFC request is not transmitted for an undesired amount of time, the use of a timer to indicate when to transmit an AFC request enables AFC requests to still be transmitted.

Figure 12:
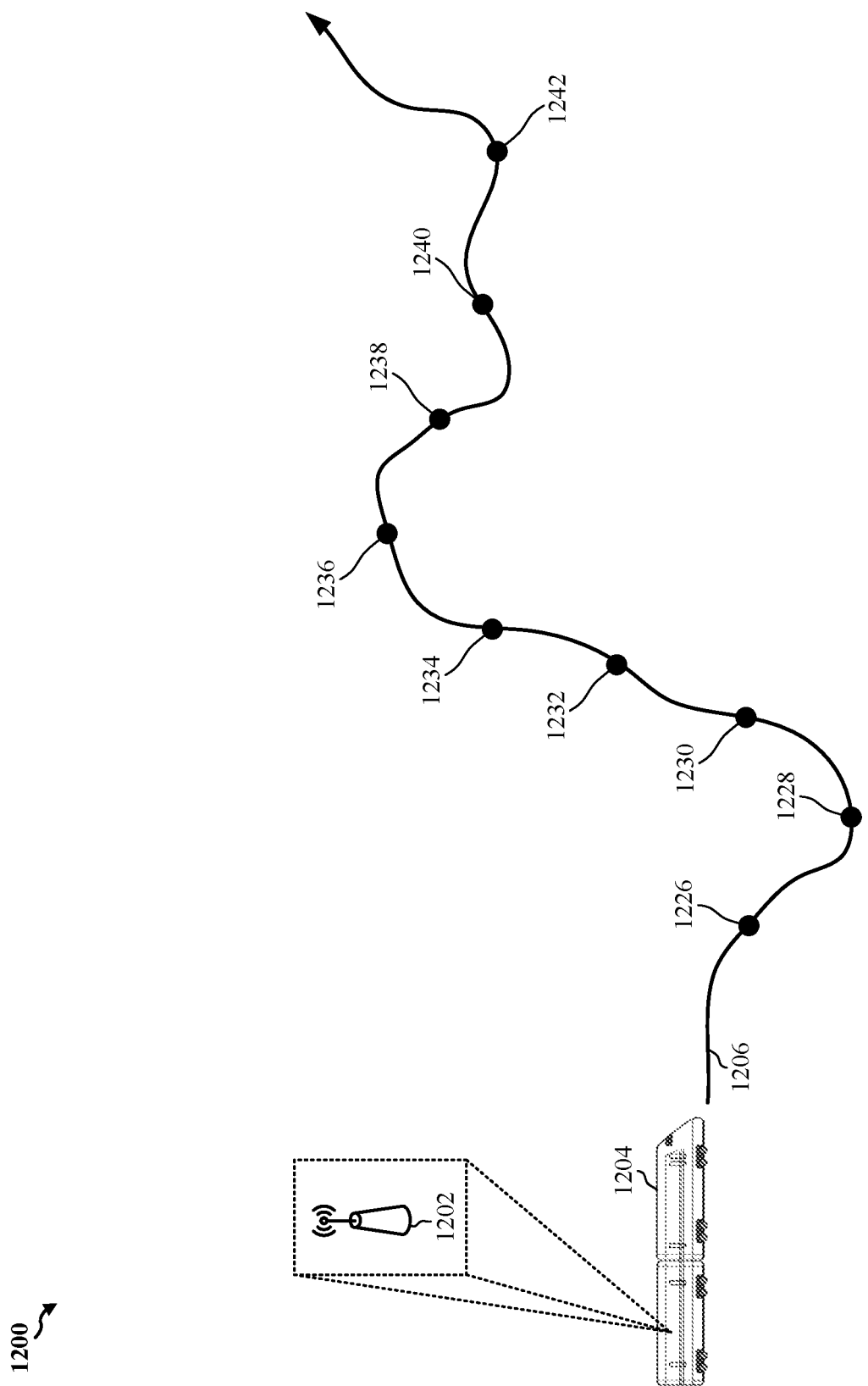
FIG. 12 shows a pictorial diagram of a wireless communication device transmitting AFC requests at regular intervals.

FIG. 12 shows a pictorial diagram 1200 of a wireless communication device 1202 transmitting AFC requests at regular intervals. The wireless communication device 1202 may be an example implementation of the wireless communication device 502 in FIG. 5 and may be referred to simply as device 1202. For example, as noted above, the device 1202 may be an AP or may be a STA communicably coupled to the AP. As depicted, the device 1202 is included in a high speed train 1204 (which may be an example implementation of the high speed train 504) travelling along the path 1206 (which may be the same as path 506). At locations 1226-1242 along the path 1206, the device 1202 transmits an AFC request. The device 1202 transmits the AFC request to a network entity currently serving the device 1202 network entity. The AFC request received by the network entity is forwarded to the AFC server. The AFC server processes the AFC request and generates an AFC response, which is transmitted through the cellular network and by the serving network entity to the device 1202.

Locations 1226-1242 along the path 1206 are associated with a timer indicating that an AFC request is to be transmitted. In the example, the timer may be configured to count an x number of minutes of any suitable integer x, which may be defined by the manufacturer, defined by the vendor, or may be defined or adjusted by a user. In some implementations, the amount of time to be counted is based on a required minimum number of AFC requests to be transmitted over a period of time or a required maximum amount of time between AFC requests (which may be defined by a standard, by a governing organization, or by a vendor).

While regular intervals between the locations 1226-1242 are depicted in FIG. 12, in some implementations, the intervals between locations may be irregular. For example, if a same time is counted by the timer, the distance between locations may vary based on the high speed train 1204 making stops or adjusting its speed based on track or weather conditions. In addition, or to the alternative, the timer may count differing amounts of time. The AFC requests transmitted at locations 1226-1242 may be typical AFC requests including the current location of the device 1202, and the AFC response may be typical AFC responses including the AFC power level indication for the location of the device 1202. Similar to as described above with reference to FIG. 10, the information from the AFC responses may be stored in a table (such as similar to the example Table 1 above), and the information stored in the table (such as the stored locations and AFC power level indications and, optionally, frequency indicators) may be used to learn a location pattern of the device 1202 (which may include when or where to switch transmit power for transmissions in the 6 GHz wireless band and, optionally, the frequency to be used in the 6 GHz wireless band).

In FIGS. 10-12, the device travelling (such as an AP in a high speed train) is depicted as determining when to transmit an AFC request and transmitting the AFC request. The device also learns its location pattern based on the information from the received AFC responses that is stored in a table. In some other implementations, a network entity may assist in transmitting AFC requests to the AFC server, determining the location pattern of the device, or otherwise being able to generate an AFC response to an AFC request from the device without needing to transmit an AFC request to the AFC server. For example, the network entity may identify when to transmit AFC requests to the AFC server for a device, generate an AFC request based on a tracked location of the device or a timer associated with the device, and transmit the AFC request to the AFC server. With the network entity handling the transmission of AFC requests to the AFC server, the device may not require modification for AFC. As such, the device may not transmit AFC requests or may transmit AFC requests without any limit regarding location areas, handoffs, or timers. In this manner, the number of AFC requests provided to the AFC server (which may be limited as to the number of AFC requests that may be processed) may be reduced by the network entity to prevent the AFC server from being saturated as the number of devices transmitting AFC requests increases. In implementations in which the cellular network assists with the AFC operations (such as AFC operations described above with reference to FIGS. 10-12 as being performed by the device), a network entity may be configured to track a location of a device and the AFC power level indications included in AFC responses for the device's location in order to be able to generate an AFC response without forwarding an AFC request from the device to the AFC server. For example, the network entity may store a table including the device's location and the AFC power level indication from previously received AFC responses for the device, and the network entity may use a machine learning model (or another suitable model) to learn the device's location pattern based on the information in the table. As noted above, if the device manages AFC operations, an AFC event may include one or more of the device crossing a location border, a handoff of the device between network entities, or an AFC associated timer indicating an AFC request is to be sent. In some implementations of a network entity assisting with managing AFC operations, an AFC event may include receiving an AFC request from the device (such as from an AP).

Figure 13:
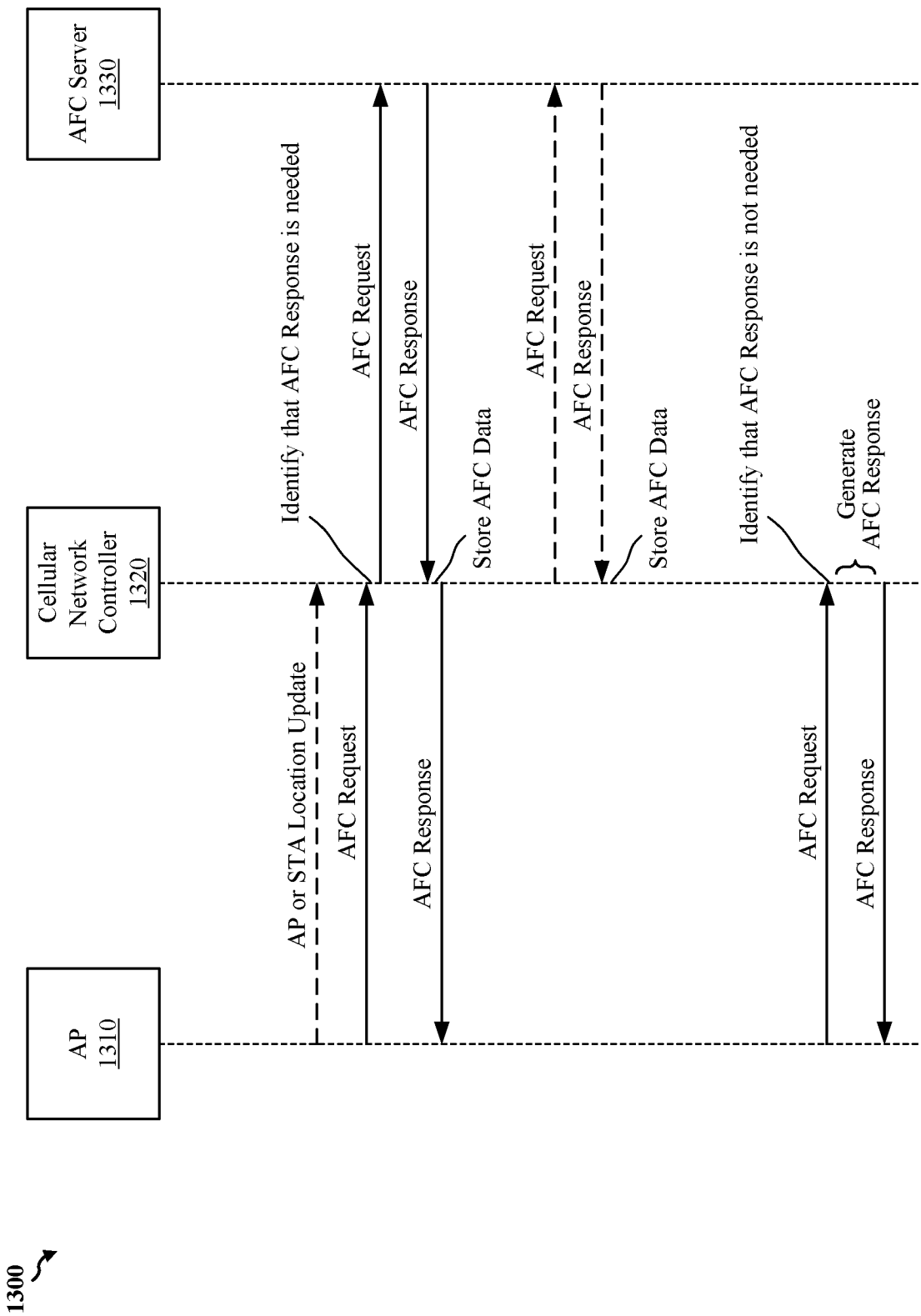
FIG. 13 shows a sequence diagram depicting an example wireless communication that supports cellular network assistance in controlling a wireless communication device's transmit power, according to some implementations.

FIG. 13 shows a sequence diagram depicting an example wireless communication 1300 that supports cellular network assistance in controlling a wireless communication device's transmit power, according to some implementations. The wireless communication 1300 may be performed between AP 1310, cellular network controller 1320, and AFC server 1330. The AP 1310 may be an example implementation of the AP 402 of FIG. 4A (which may be an example implementation of the wireless communication device 202 of FIG. 2). In some implementations, the AFC request may originate from a STA communicably coupled to the AP 1310 (such as a STA that is part of the AP's BSS), and the AP 1310 may forward AFC requests and responses between the STA and the cellular network controller 1320. The AFC server 1330 may be an example implementation of the AFC server 226 of FIG. 2. The cellular network controller 1320 may be any suitable component of a cellular network (such as the cellular network 200 of FIG. 2). For example, a location server including the location registers 218 and implementing an LMF may be configured to assist with reducing the number of AFC requests forwarded to the AFC server 226. In another example, a network entity 206 may be configured to assist with reducing the number of AFC requests forwarded to the AFC server 226 for devices served by the network entity 206. In a further example, a component of the core network separate from a location server may be configured to use the location registers to track the locations of one or more devices and the AFC power level indications received in AFC responses from the AFC server for one or more of those locations. In the examples below, the cellular network controller 1320 is described as a location server including the location registers to store a table including the locations of the AP 1310 and an AFC power level indication associated with one or more of the locations. While not depicted in FIG. 13, the communications between the AP 1310 and the cellular network controller 1320 may be through one or more of a network entity, an RNC, or one or more components of a core network. The communications between the cellular network controller 1320 and the AFC server 1330 may be through one or more core network components, one or more application servers, or one or more other components to communicatively couple the cellular network controller 1320 and the AFC server 1330.

In the example of FIG. 13, the AP 1310 transmits one or more AFC requests to the cellular network controller 1320. In some implementations, the AFC requests from the AP 1310 are based on typical times when an AFC request is to be transmitted by a device for AFC (such as based on a standard or a vendor). The cellular network controller 1320 may manage whether an AFC request is to be forwarded to the AFC server 1330 to receive an AFC response. For the first depicted AFC request transmitted by the AP 1310 to the cellular network controller 1320, the cellular network controller 1320 identifies that an AFC response from the AFC server 1330 (which indicates the transmit power that may be used by the AP 1310 or STA) is needed. For example, the cellular network controller 1320 may determine that the received AFC request is associated with an AFC event (and is configured to forward such AFC requests). In a further example, the cellular network controller 1320 may determine that the current location of the AP 1310 (or STA) indicated in the AFC request or otherwise known by the cellular network controller 1320 does not match any stored location in a table linking AFC power level indications to the stored locations. In another example, the table may not include sufficient entries to determine the location areas associated with different cells. In a further example, the table may not include sufficient entries to determine a location pattern of the AP 1310 (or STA). As noted above, in some examples, determining the location areas or determining the location pattern may be based on a machine learning model (or another suitable model) trained using the locations and AFC power level indications from past AFC responses and stored in the table. After the location areas or the location pattern is known, the cellular network controller 1320 may predict an AFC power level indication and, optionally, a frequency indicator for the current location of the device.

The cellular network controller 1320 forwards the first AFC request received from the AP 1310 to the AFC server 1330. The AFC server 1330 processes the AFC request, generates an AFC response, and transmits the AFC response to the cellular network controller 1320. The cellular network controller 1320 stores the AFC data in the AFC response. For example, the cellular network controller 1320 may store the location and associated AFC power level indication included in the AFC response in a table (such as a table similar to Table 1 above). Referring back to FIG. 2, the locations of the AP 1310 (or STA) may be stored in the location registers 218, which may also store an associated AFC power level indication. In some implementations, the cellular network controller 1320 may also store a frequency indicator included in the AFC response. In the examples below, the device is described as being the AP 1310, but the device may be a STA communicably coupled to the AP 1310 for performing the operations described in the below examples.

In some implementations, the AP 1310 transmits AP location updates to the cellular network controller 1320. For example, the AP 1310 may use a GPS receiver to identify its current location (such as in latitude and longitude) and periodically indicate its location to the cellular network controller 1320. In another example, a location server implementing an LMF may use signal measurements of DL signals received at the AP 1310 or UL signals received at a network entity to determine the location of the AP 1310. In the example, the AP location update may include the signal measurements provided by the AP 1310 or signals from the AP 1310 to generate signal measurements at a network entity. With the cellular network controller 1320 receiving periodic AP location updates, the cellular network controller 1320 tracks the location of the AP 1310. Referring back to FIG. 2, the location updates of the AP 1310 may be stored in the location registers 218.

Since the cellular network controller 1320 tracks the location of the AP 1310, the cellular network controller 1320 may be able to independently generate an AFC request that includes a location of the AP 1310. In some implementations, the cellular network controller 1320 transmits the independently generated AFC request to the AFC server 1330, receives an AFC response from the AFC server 1330, and stores the AFC data included in the AFC response (such as the AFC power level indication associated with the location included in the AFC request transmitted to the AFC server). If the cellular network controller 1320 is able to independently generate AFC requests, the cellular network controller 1320 may transmit AFC requests at any suitable time. For example, the cellular network controller 1320 may identify when an AFC event occurs for the AP 1310 and transmit an AFC request for the AP 1310 based on the AFC event. In some implementations, the AFC event may include receiving an AFC request from the AP 1310. In some other implementations, the AFC event may include the AP 1310 crossing a location border, a handoff of the AP 1310 between network entities, or an AFC associated timer indicating that an AFC request is to be sent. In another example, if data in the table for the AP 1310 is sparse, the cellular network controller 1320 may use a timer to indicate when to periodically generate and transmit an AFC request based on the last known AP location in order to receive more AFC data for the table. In addition, or to the alternative, the cellular network controller 1320 may generate and transmit AFC requests for one or more devices based on a current load of the AFC server 1330. For example, the cellular network controller 1320 may manage forwarding AFC requests for all devices communicably coupled to the cellular network. Based on the AFC requests being forwarded, the cellular network controller 1320 is able to identify times when the AFC server is processing fewer AFC requests and thus has bandwidth to handle more AFC requests. As such, the cellular network controller 1320 may generate and transmit AFC requests for devices for which additional AFC power level indications may be needed for the current locations (such as for devices for which the location pattern is not yet determined, the current location deviates from the location pattern, the location areas are not yet determined, or the current location is not included in any of the determined location areas).

As noted above, after the location areas or the location pattern is known, the cellular network controller 1320 may predict an AFC power level indication for the current location of the device. As such, the cellular network controller 1320 may receive an AFC request from the AP 1310, identify that an AFC response is not needed, generate the AFC response without transmitting an AFC request to the AFC server 1330, and transmit the generated AFC response to the AP 1310. For example, the AFC request indicates a current location of the AP 1310. The cellular network controller 1320 identifies that the current location is in a determined location area associated with a specific transmit power, and the cellular network controller 1320 generates and transmits to the AP 1310 an AFC response including an AFC power level indication indicating the transmit power associated with the location area.

In some implementations, the determined location areas and associated transmit power levels may be stored at a network entity serving the AP 1310. For example, the cellular network controller 1320 may tag each combination of location area and cell ID across the cellular network with a permissible transmit power based on the AFC responses received from the AFC server. For example, each combination may be linked to one of the transmit power requirements including LPI required, SP allowed, VLP required, or the transmit power may be flexible. In some implementations, one or more combinations may be associated with an unknown permissible transmit power (such as based on sparse AFC data for locations associated with the combination). The cellular network controller 1320 may tag different combinations over time as the permissible transmit power for those combinations is determined. The link of the different combinations and the permissible transmit power is stored in a table. Each network entity of the cellular network may store a copy of the table, and the network entity may refer to the table to generate an AFC response to an AFC request without the need to forward the AFC request to the AFC server. In some implementations, the table may be updated or completed over time for the different combinations as new AFC responses from the AFC server are received. If the AFC responses include frequency indicators, the table may also include the frequency indicators, such as for different combinations of location area and cell ID.

One benefit of network assisted AFC is that locations and AFC power level indications and, optionally, frequency indicators associated with a plurality of devices may be used to identify a transmit power and, optionally, a transmit frequency to be used by one device. In other words, the data used to identify the transmit power and frequency is not limited to that specific device's AFC data. As such, while some examples above describe the use of one device's AFC data to determine regions of mobility or other areas, AFC data pooled for a plurality of device's may be used to generate such regions or areas.

As described in various implementations above regarding the transmission of AFC requests based on AFC events, setting a transmit power and, optionally, a transmit frequency of a device without requiring the AFC server to process an AFC request and transmit an AFC response may be based on the device keeping track of AFC power level indications and, optionally, frequency indicators for different locations or the network assisting with keeping track of AFC power level indications and frequency indicators for different locations. For example, an AP or STA may determine its location pattern, regions of mobility, location areas, etc. to identify the transmit power and transmit frequency to be used for its current location. In another example, a network component may determine the AP's or STA's location pattern, regions of mobility, location areas, etc. to identify the transmit power and transmit frequency to be used by the AP or STA for the AP's or STA's current location. FIGS. 14-22 show flowcharts illustrating example operations for wireless communication that supports AFC requests based on AFC events for controlling a transmit power of a wireless communication device.

Figure 14:
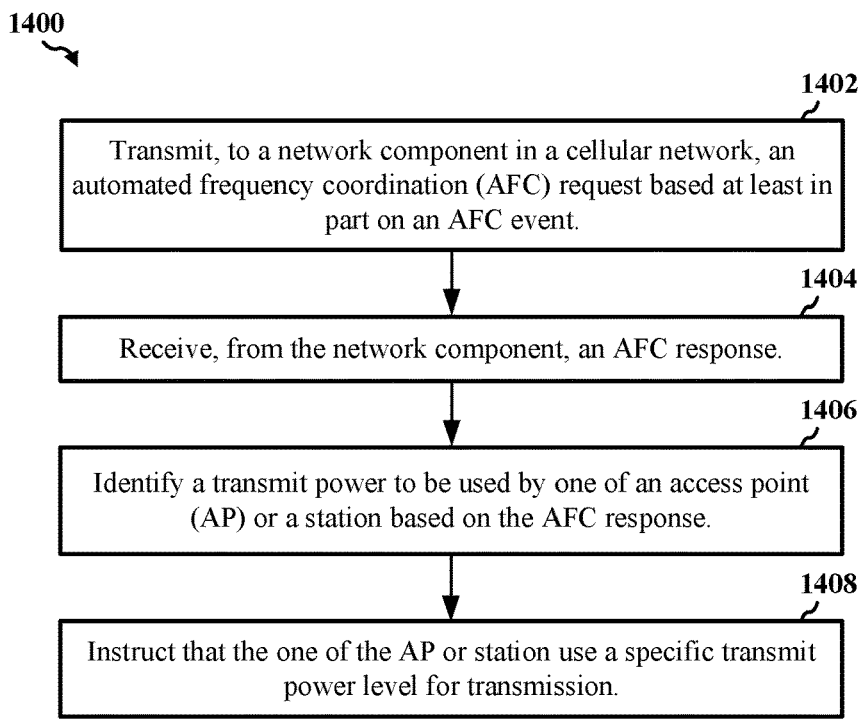
FIGS. 14-22 show flowcharts illustrating example operations for wireless communication that supports AFC requests based on AFC events for controlling a transmit power of a wireless communication device, according to some implementations.

FIG. 14 shows a flowchart illustrating an example operation 1400 for wireless communication that supports AFC requests based on AFC events for controlling a transmit power of a wireless communication device, according to some implementations. The operation 700 may be performed by any suitable device such as the wireless communication device 300 described above with reference to FIG. 3. In some instances, the operation 700 may be performed by a device operating as or within an AP, such as the AP 102 of FIG. 1, the wireless communication device 300 of FIG. 3, or the AP 402 of FIG. 4A. In some other instances, the operation 700 may be performed by another suitable device, such as the STA 404 of FIG. 4B, which may be an SAP (which may also be referred to as an AP) or may be serviced by an AP. In some other instances, the operation 1400 may be performed by a network controller, such as a network entity 406 of FIG. 4C, a location server, a core network component, or another suitable component of a cellular network.

For example, at 1402, the device transmits, to a network component in a cellular network, an AFC request based at least in part on an AFC event. In some implementations, the AFC event includes one of an AP (or STA) crossing a cellular based location border, a handoff of the AP between network entities, or an AFC associated timer indicating an AFC request is to be sent. At 1404, the device receives, from the network component, an AFC response. For example, an AP may receive the AFC response from the network component from a network entity, which may be the network component or may an intermediate device between the network component and the AP. If a STA transmitted the AFC request, the AP may forward the AFC response to the STA. At 1406, the device identifies a transmit power to be used by one of an AP or a STA based on the AFC response. For example, the AFC power level indication included in the AFC response may indicate a maximum transmit power allowed for the current location of the AP or the STA. At 1408, the device instructs that the one of the AP or STA use a specific transmit power level for transmission. In some implementations, the device also identifies a frequency to be used by the AP or STA based on the AFC response. For example, the AFC response may include a frequency indicator to indicate one or more channels in the 6 GHz spectrum to be used for transmission by the AP to a network entity. As such, the device may also instruct that the AP (or STA) use a specific 6 GHz frequency for transmission.

If the device performing operation 1400 is included in an AP or STA, the AFC request is transmitted to a network entity, and the AFC response is received from the network entity.

Figure 15:
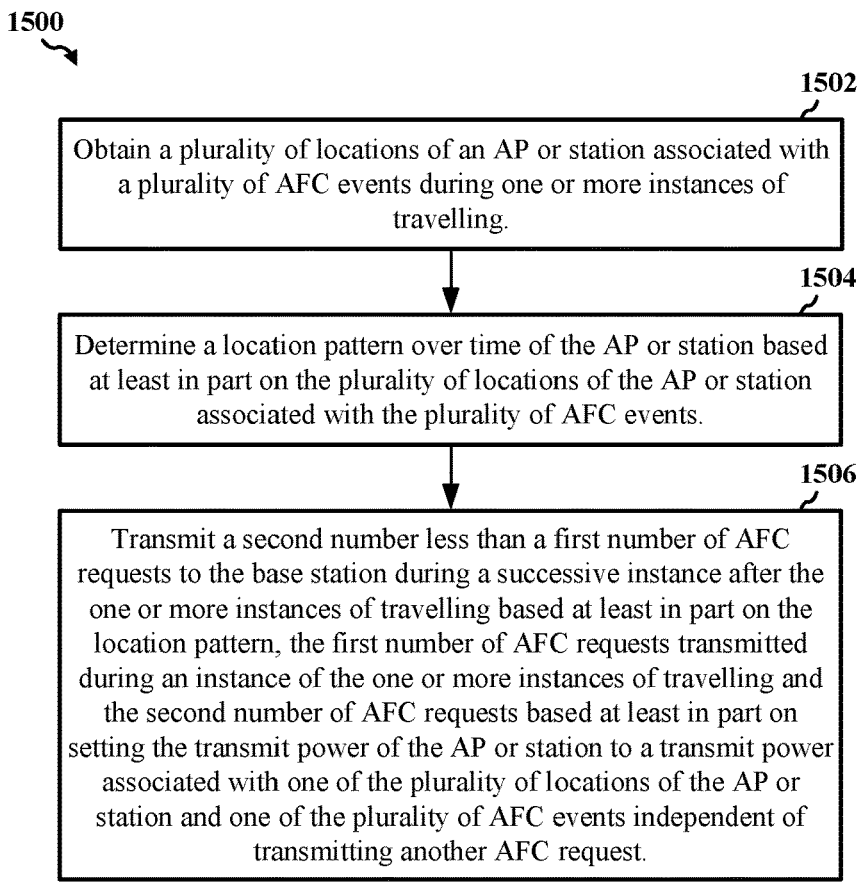

FIG. 15 shows a flowchart illustrating an example operation 1500 for wireless communication that supports AFC requests based on AFC events for controlling a transmit power of a wireless communication device, according to some implementations. The operation 1500 may be in addition to the operation 1400, and the device performing operations 1400 and 1500 may be an AP or a STA. The operation 1500 is regarding the AP or STA determining its location pattern based on a plurality of AFC requests and AFC responses associated with a plurality of AFC events.

At 1502, an AP or STA obtains a plurality of locations of the AP or STA, with the AP or STA being associated with a plurality of AFC events during one or more instances of travelling. For example, if an AFC event includes a handoff of the AP between network entities, each time a handoff occurs, the AP or STA transmits an AFC request to a network entity. The AFC request is provided to an AFC server, and the AFC server transmits a response including an AFC power level indication for the location of the AP or STA. The AP or STA receives the AFC response, obtains the AFC power level indication from the AFC response, and stores the AFC power level indication and associated AP or STA location in a table. As additional AFC events occur, the AP or STA transmits additional AFC requests, receives additional AFC responses, and obtains the AFC power level indications from the AFC responses. In some implementations, the AP or STA may obtain the plurality of locations from a sensor, such as a GPS receiver, indicating the location of the AP or STA, with the locations being used to generate one or more AFC requests. In some other implementations, the AP or STA may obtain the plurality of locations from the plurality of received AFC responses. As time passes, and the number of AFC events increases, the number of AP or STA locations that are obtained increases (such as the number of table entries increasing).

At 1504, the AP or STA determines a location pattern over time of the AP or STA based at least in part on the plurality of locations of the AP or STA associated with the plurality of AFC events. As noted above, in some implementations, any suitable machine learning model (or another suitable model) may be trained to determine the location pattern of the AP or STA based on the obtained AP or STA locations.

At 1506, the AP or STA transmits a second number less than a first number of AFC requests to the network entity during a successive instance after the one or more instances of travelling based at least in part on the location pattern. For example, the AP or STA may travel along a same path or similar path during a successive instance of travel as during the one or more instances of travel, with the AP or STA transmitting a smaller number of AFC requests during the successive instance of travel than the previous instance of travel. If the STA transmits the AFC requests, the AFC requests may be transmitted to an AP that forwards the AP requests to the network entity. The AP or STA transmits the first number of AFC requests during an instance of the one or more instances of travelling (e.g., along the same or similar path). As such, the AP or STA receives a first number of AFC responses during the instance of travelling and obtains AFC power level indications for the AP or STA locations associated with the first number of AFC responses. The second number of AFC requests is based at least in part on setting the transmit power of the AP or STA to a transmit power associated with one of the plurality of locations of the AP or STA and one of the plurality of AFC events independent of transmitting another AFC request. For example, the AP or STA may use its location pattern and its current location to identify that the AP or STA is entering into a region of mobility or a location area associated with a different transmit power than the current transmit power of the AP or STA. The AP or STA may store a table indicating the regions of mobility or the location areas in which the AP or STA may enter or exit, and the table may include the transmit power allowed for each of the region or areas. The table may also indicate the frequency to be used for transmission (e.g., the channel to be used in the 6 GHz wireless band for transmission) in each of the regions or areas. The AP or STA may use the table to identify its location as in a specific region or area and identify the transmit power and, optionally, the transmit frequency to be used while in that region or area. Referring back to FIG. 14, if the device is the AP or STA, instructing that the AP or STA use a specific transmit power level may include the AP or STA setting its transmit power to the transmit power level indicated in the table for the specific region or area.

Referring back to FIG. 14, if the device performing operation 1400 is included in a cellular network controller (such as a location server, a network entity, or another suitable core network component), the cellular network controller may receive one or more AFC requests from the AP and provide one or more AFC responses to the AP. In some implementations, the AFC event includes receiving an AFC request from the AP. The cellular network controller may transmit an AFC request to the AFC server, and the cellular network controller may receive an AFC response from the AFC server. If the cellular network controller transmitting the AFC request to the AFC server is based on an AFC event of the AP transmitting an AFC request to the cellular network controller, the cellular network controller may provide the received AFC response from the AFC server to the AP. As noted above, the cellular network controller may obtain the AFC power level indication and other AFC data (such as a frequency indicator) to be stored at the cellular network controller in order to identify a location pattern of the AP or a STA, regions of mobility, location areas, or other information that may be used to identify a transmit power and, optionally, a transmit frequency to be used by the AP or STA without requiring another AFC request be transmitted to the AFC server.

Figure 16:
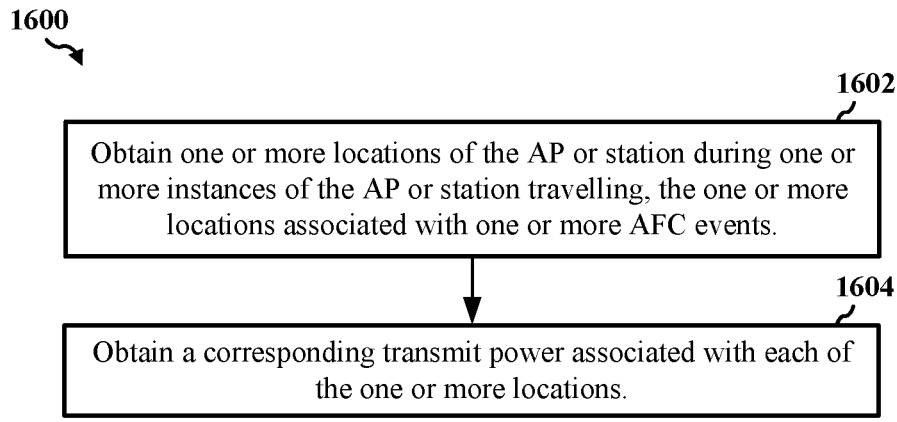

FIG. 16 shows a flowchart illustrating an example operation 1600 for wireless communication that supports AFC requests based on AFC events for controlling a transmit power of a wireless communication device, according to some implementations. The operation 1600 may be in addition to the operation 1400, and the device performing operations 1400 and 1600 may be a cellular network controller. The operation 1600 is regarding the cellular network controller obtaining locations of the AP or STA and corresponding transmit powers associated with the locations.

At 1602, the cellular network controller obtains one or more locations of the AP or STA during one or more instances of the AP or STA travelling, the one or more locations associated with one or more AFC events. For example, if an AFC event includes receiving an AFC request from the AP and the AP transmits one or more AFC requests, the cellular network controller may transmit the one or more AFC requests to the AFC server, receive one or more AFC responses from the AFC server, and obtain the one or more locations of the AP or STA from the one or more AFC responses. In another example, the cellular network controller may obtain one or more locations of the AP or STA from one or more AFC requests from the AP indicating the current location of the AP or STA. In another example, the cellular network controller may obtain one or more locations of the AP or STA from one or more AP or STA location updates received for the AP (such as described above with reference to FIG. 13).

At 1604, the cellular network controller obtains a corresponding transmit power associated with each of the one or more locations. For example, the cellular network controller may obtain the AFC power level indications included in the one or more AFC responses for the one or more AFC requests transmitted by the cellular network controller to the AFC server. Based on the AFC power level indication corresponding to an AP or STA location, the cellular network controller may determine the transmit power to be used by the AP or STA for the AP or STA location. For example, if the AFC power level indication is a binary indicator as to whether or not SP is allowed at the corresponding location, the cellular network controller may identify whether the transmit power is to be SP or LPI for the AP or STA at the corresponding AP or STA location based on the binary indicator. While not depicted in FIG. 16, the cellular network controller may store the obtained transmit powers and the obtained AP or STA locations in a table or another suitable memory, such as described above. The cellular network controller may also transmit the one or more AFC responses to the AP.

As more AP or STA locations and corresponding transmit powers are obtained by the cellular network controller, the cellular network controller may have stored enough AFC data to be able to generate an AFC response instructing the AP or STA as to the transmit power to be used without transmitting an AFC request to the AFC server. For example, the cellular network controller may match an AP or STA location from an AFC request received from the AP or STA to a stored location in the table, and the cellular network controller may be able to generate the AFC response to the AFC request based on the transmit power indicated in the table as corresponding to the location. In another example, the cellular network controller may determine that the AP or STA location from an AFC request is in a region or area associated with a transmit power level, and the cellular network controller may generate the AFC response to the AFC request based on the transmit power level associated with the region or area.

In some implementations, the AFC response may also include a frequency indicator. As such, the cellular network controller may also obtain and store a frequency indicator corresponding to the AP or STA location. The cellular network controller may be able to generate the AFC response to include a frequency indicator based on one or more frequency indicators stored in a similar manner as described above with reference to transmit power indicated in the table. The frequency indicator may indicate the transmit frequency to be used for transmission (e.g., the transmit frequency in the 6 GHz wireless band to be used by the AP to transmit to a network entity).

Figure 17:
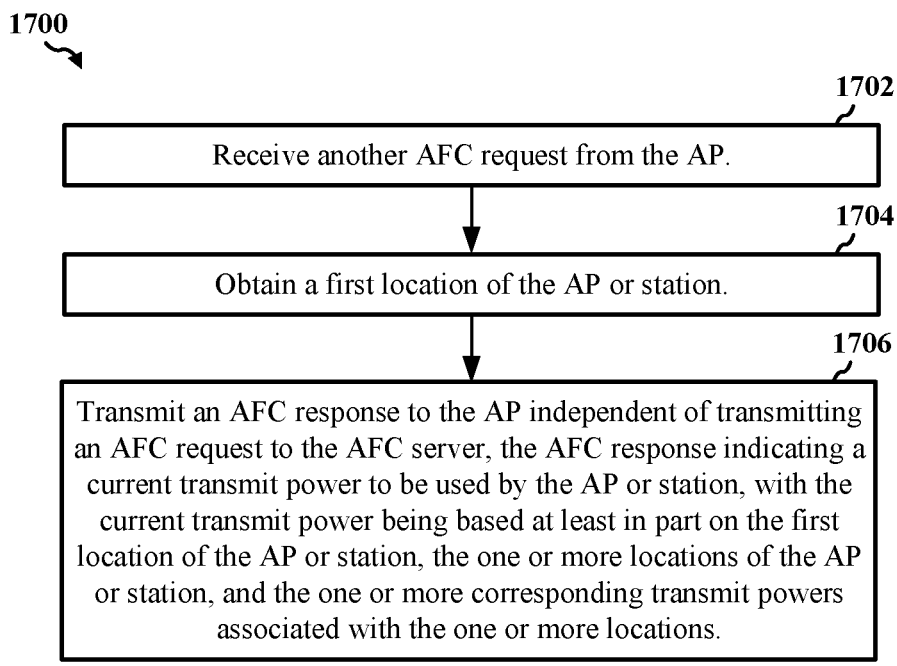

FIG. 17 shows a flowchart illustrating an example operation 1700 for wireless communication that supports AFC requests based on AFC events for controlling a transmit power of a wireless communication device, according to some implementations. The operation 1700 may be in addition to the operation 1400 and operation 1600, and the device performing operations 1400, 1600, and 1700 may be a cellular network controller. The operation 1700 is regarding the cellular network controller transmitting an AFC response to the AP without transmitting an AFC request to the AFC server.

At 1702, the cellular network controller receives another AFC request from the AP. At 1704, the cellular network controller obtains a first location of the AP or STA. For example, the AFC request may indicate the first location of the AP or STA, which may be parsed by the cellular network controller. In another example, the cellular network controller may track the location of the AP or STA (such as based on periodic AP or STA location updates from the AP or a network entity), and the cellular network controller may identify the first location of the AP or STA as the last tracked location of the AP or STA.

At 1706, the cellular network controller transmits an AFC response to the AP independent of transmitting an AFC request to the AFC server. The AFC response indicates a current transmit power to be used by the AP, and the current transmit power is based at least in part on the first location of the AP or STA, the one or more locations of the AP or STA previously obtained, and the one or more corresponding transmit powers associated with the one or more locations that are previously obtained. For example, as noted above, the cellular network controller may store an indication of the one or more locations of the AP or STA and an indication the one or more corresponding transmit powers (which may be obtained from one or more AFC responses) in a table. The cellular network controller may then receive the AFC request indicating the first location of the AP or STA. The cellular network controller may compare the first location to the stored locations in the table. If a match is identified, the cellular network controller may generate and transmit an AFC response including an AFC power level indication indicating the corresponding transmit power associated with the matching location stored in the table. In another example, a table including combinations of location areas and cell IDs across the cellular network and the permissible transmit power level tagged for each combination may be stored at the cellular network controller. The cellular network controller may identify that the first location belongs to one of the combinations and may generate and transmit an AFC response to the AP, with the AFC response including an AFC power level indication indicating the permissible transmit power associated with the combination in the table. In some implementations, the table may be stored at a network entity that receives the AFC request including the first location from the AP, and the network entity transmits the AFC response to the AP based on the table without forwarding the AFC request from the AP to the AFC server. In another example, a machine learning model (or another suitable model) trained using the one or more AP or STA locations and the one or more corresponding transmit powers may generate a transmit power to be indicated to the AP based on the first location of the AP or STA. In some implementations, the cellular network controller (such as a network entity) also includes a frequency indicator in the AFC response to indicate one or more transmit frequencies to be used (e.g., one or more channels in the 6 GHz wireless band to be used by the AP to transmit to a network entity).

In some implementations, the cellular network controller may determine one or more of a location pattern of the AP or STA or an AFC request pattern from the AP, and the cellular network controller may use the one or more patterns to identify the transmit power and, optionally, the transmit frequency to be indicated to the AP in response to an AFC request from the AP.

Figure 18:
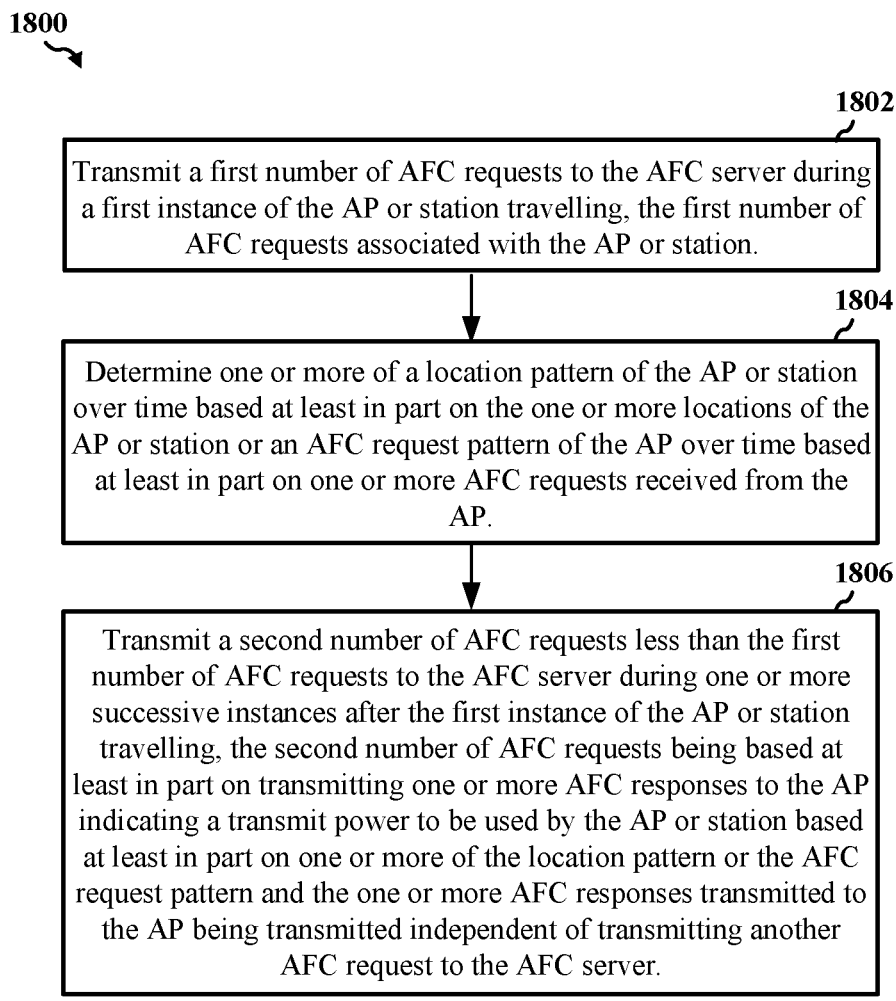

FIG. 18 shows a flowchart illustrating an example operation 1800 for wireless communication that supports AFC requests based on AFC events for controlling a transmit power of a wireless communication device, according to some implementations. The operation 1800 may be in addition to the operations 1400, 1600, and 1700, and the device performing operations 1400, 1600, 1700, and 1800 may be a cellular network controller. The operation 1800 is regarding the cellular network controller determining a location pattern or an AFC request pattern of the AP or STA in order to be able to identify a transmit power to be indicated in an AFC response without transmitting an AFC request to the AFC server and thus reduce the number of AFC requests sent to the AFC server.

At 1802, the cellular network controller transmits a first number of AFC requests to the AFC server during a first instance of the AP or STA travelling, the first number of AFC requests associated with the AP or STA. At 1804, the cellular network controller determines one or more of a location pattern of the AP or STA over time based at least in part on the one or more locations of the AP or STA or an AFC request pattern of the AP over time based at least in part on one or more AFC requests received from the AP. For example, an AFC request pattern may indicate specific times at when or specific locations at which the AP transmits an AFC request. At 1806, the cellular network controller transmits a second number of AFC requests less than the first number of AFC requests to the AFC server during one or more successive instances after the first instance of the AP or STA travelling. In some examples, the one or more successive instances of travel may be along the same path as the first instance of travel or may be along similarly located paths as the first instance of travel. The second number of AFC requests is based at least in part on transmitting one or more AFC responses to the AP indicating a transmit power to be used by the AP or STA based at least in part on one or more of the location pattern or the AFC request pattern. The one or more AFC responses transmitted to the AP are transmitted independent of transmitting another AFC request to the AFC server. As such, the AP transmits the one or more AFC requests to the cellular network controller, and the cellular network controller is able to generate an AFC response for each of the one or more AFC requests based on previously received AFC data used to generate one or more of the location pattern or the AFC request pattern without needing to transmit any of the one or more AFC requests to an AFC server. For example, after the location pattern and the AFC request pattern is generated, the cellular network controller may use the AFC request pattern and the location pattern to identify specific locations that may be associated with a future AFC request or holes in the coverage area in which regions of mobility of location areas may exist and may be associated with a future AFC request. In some implementations, the cellular network controller may transmit AFC requests for the identified locations to the AFC server to receive the AFC power level indications in the AFC responses associated with the locations. In this manner, if a future AFC request from the AP includes one of the identified locations, the cellular network controller is able to determine the corresponding transmit power to be indicated in the AFC response without transmitting another AFC request to the AFC server.

As depicted in FIG. 18, the second number of AFC requests to the AFC server may be less than the first number of AFC requests by at least the number of the one or more AFC responses generated by the cellular network controller independent of transmitting an AFC request to the AFC server. For example, during a first instance of the AP or STA travelling along a path, the cellular network controller may receive the first number of AFC requests from the AP and transmit the first number of AFC requests to the AFC server to obtain AFC data for use in determining the location pattern (or the AFC request pattern) of the AP. During a later instance of the AP or STA travelling along the path (or a similarly located path), the cellular network controller may receive a same number of AFC requests from the AP as during the first instance, but the cellular network may transmit only a subset of the number of AFC requests received from the AP during the later instance. The reduction in the number of AFC requests being transmitted to the AFC server is attributed to the cellular network controller being able to generate the AFC response based on previously received AFC data.

In some implementations, the location pattern may be determined by a logistic regression model (which may also be referred to as a logistic model), with the first number of AFC requests and received AFC data for the first number of AFC requests being used as inputs to the logistic regression model.

Figure 19:
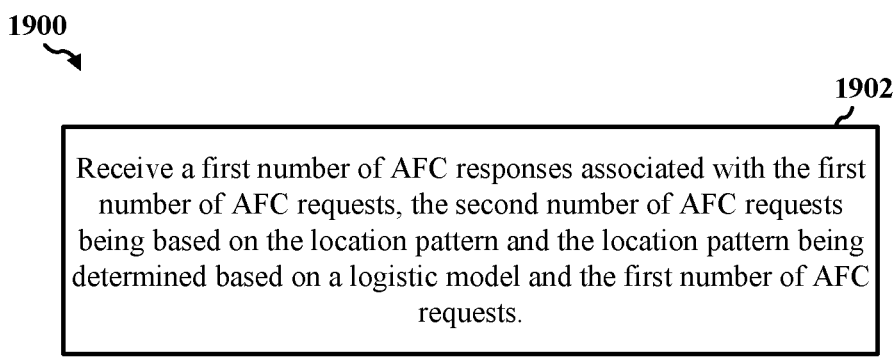

FIG. 19 shows a flowchart illustrating an example operation 1900 for wireless communication that supports AFC requests based on AFC events for controlling a transmit power of a wireless communication device, according to some implementations. The operation 1900 may be in addition to the operations 1400, 1600, 1700, and 1800, and the device performing operations 1400, 1600, 1700, 1800, and 1900 may be a cellular network controller. The operation 1900 is regarding the use of a logistic model to generate a location pattern. At 1902, the cellular network controller receives from the AFC server a first number of AFC responses associated with the first number of AFC requests. The second number of AFC requests is based on the location pattern. For example, as noted above, the second number of AFC requests (which are received during a later instance of the AP or STA travelling (e.g., along a same or similarly located path as a first instance of travel)) is less than the first number of AFC requests (which are received during a first instance of the AP or STA travelling along a path). The difference between the first number and the second number is based on the AFC requests received by the cellular network controller for which the cellular network controller is able to generate an AFC response without transmitting an AFC request to the AFC server. For example, as noted above, the cellular network controller is able to identify the transmit power corresponding to a location indicated in the AFC request based on the location pattern of the AP or STA, which may have been used to previously request an AFC response for the same location or otherwise allow the cellular network controller to identify the corresponding transmit power. In some implementations, the location pattern is determined based on a logistic model and the first number of AFC requests. For example, a logistic model may be trained using the locations of the AP or STA in the first number of AFC requests and the AFC power level indications in the first number of AFC responses to generate an output of a transmit power corresponding to an input location. In this manner, the AP or STA location indicated in an AFC request from the AP is input into the trained logistic model, and the trained logistic model outputs a transmit power corresponding to the input AP or STA location. For example, the transmit powers that may be indicated by the trained logistic model may include whether or not SP is allowed. In another example, the transmit powers that may be indicated include SP, LPI, VLP, or any other suitably defined power level. The cellular network controller may generate and transmit an AFC response with an AFC power level indication indicating the corresponding transmit power indicated by the logistic model. If the AFC response is to also include a frequency indicator, the cellular network controller may also generate and transmit the AFC response with a frequency indicator indicating the frequency to be used (e.g., a portion of the 6 GHz frequency spectrum to be used by an AP for transmission to a network entity). In some implementations, the logistic model may be trained to have a separate output indicating the frequency to be used (such as a specific wireless channel in the 6 GHz wireless band). In some other implementations, a separate model may be trained to output the frequency to be used.

To prevent AFC requests from being transmitted at the same time or at the same locations when traversing the same path, in some implementations, AFC requests transmitted to the AFC server may be transmitted in a random manner.

Figure 20:
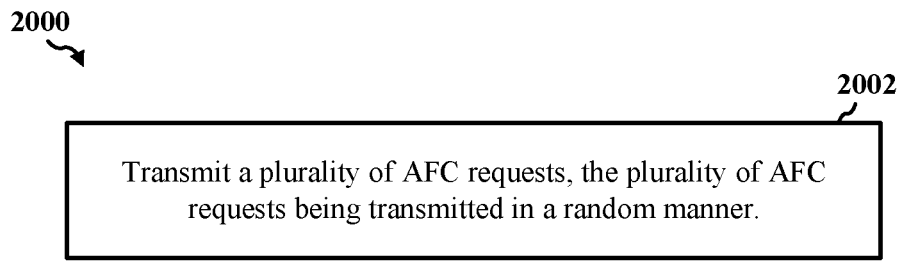

FIG. 20 shows a flowchart illustrating an example operation 2000 for wireless communication that supports AFC requests based on AFC events for controlling a transmit power of a wireless communication device, according to some implementations. The operation 2000 may be in addition to the operation 1400, and the device performing operations 1400 and 2000 may be an AP, a STA, a cellular network controller, or another suitable device. At 2002, the device transmits a plurality of AFC requests, the plurality of AFC requests being transmitted in a random manner. If the device is an AP, the AP may transmit the plurality of AFC requests to a network entity in a random manner. If the device is a STA, the STA may transmit the plurality of AFC requests to an AP in a random manner, with the AFC requests being provided by the AP to a network entity. If the device is a cellular network controller, the cellular network controller may transmit the plurality of AFC requests to an AFC server in a random manner. For example, a time may be used to count an amount of time until a next AFC request is to be transmitted. As noted above, in some implementations, the time set for the timer may be a random value or include a randomness so that the timer does not always count the same amount of time.

As the device is increasingly able to identify a transmit power and, optionally, a transmit frequency to be used without transmitting an AFC request to the AFC server, the device may decrease the number of AFC requests transmitted to the AFC server. If when to transmit an AFC request is based on an AFC associated timer indicating the time to transmit the AFC request (such as by counting down to zero), some implementations of decreasing the number of AFC requests transmitted to the AFC server may include increasing the amount of time to be counted by the AFC associated timer.

Figure 21:
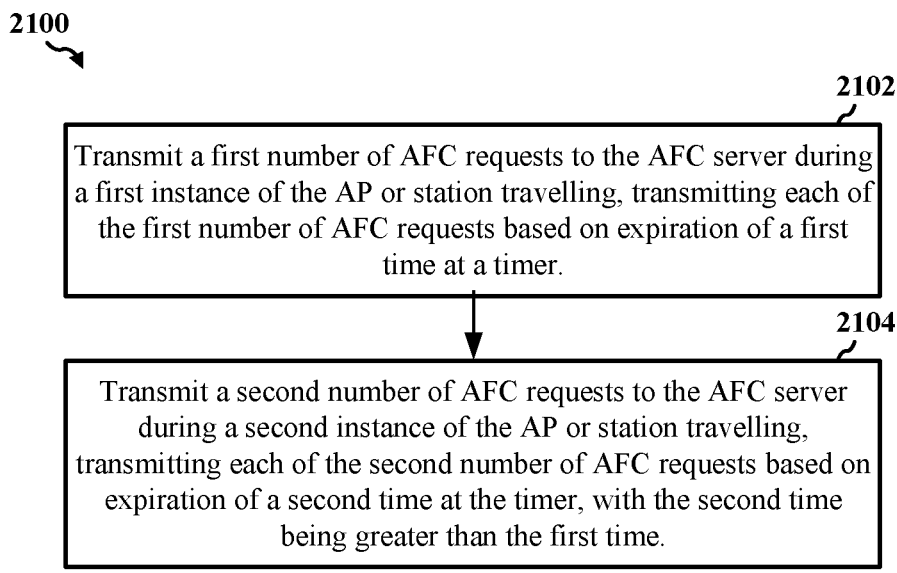

FIG. 21 shows a flowchart illustrating an example operation 2100 for wireless communication that supports AFC requests based on AFC events for controlling a transmit power of a wireless communication device, according to some implementations. The operation 2100 may be in addition to the operation 1400, and the device performing operations 1400 and 2100 may be an AP, a STA, a cellular network controller, or another suitable device. At 2102, the device transmits a first number of AFC requests to the AFC server during a first instance of the AP or STA travelling. In some examples, the first instance of travel may be along a first path. Transmitting each of the first number of AFC requests is based on expiration of a first time at a timer. To note, the first time may be a static amount of time or may vary to ensure that the AFC requests are transmitted in a random manner.

At 2104, the device transmits a second number of AFC requests to the AFC server during a second instance of the AP or STA travelling. In some examples, the second instance of travelling may be along the first path or along a second path that is similarly located to the first path (e.g., along a road bordering a train track associated with the first path, a second path repeatedly crossing the first path, or a second path with various points having close geolocations to points of the first path). Transmitting each of the second number of AFC requests is based on expiration of a second time at the timer, and the second time is greater than the first time. In this manner, the spacing between AFC requests may increase overall based on the difference between the second time and the first time. Similar to the first time, the second time may be static or may vary to ensure that the AFC requests are transmitted in a random manner. If the first time and the second time may vary, the first time may be a within a bounded range that is lower than a bounded range defined for the second time. In this manner, the second time may remain greater than the first time even if the first time and the second time may vary.

Any storage of a device is limited in size. For example, a specific amount of memory may be allocated to store the table including AP or STA locations, AFC power level indications, and, optionally, frequency indicators. As such, the table (or other memory used to store such AFC data) may be limited to a maximum number of entries. In some implementations, a device may limit the number of AFC requests transmitted based on the memory size of the device. For example, if a table is only able to store ten additional locations and corresponding AFC power level indications, the device may transmit only ten more AFC requests.

Figure 22:
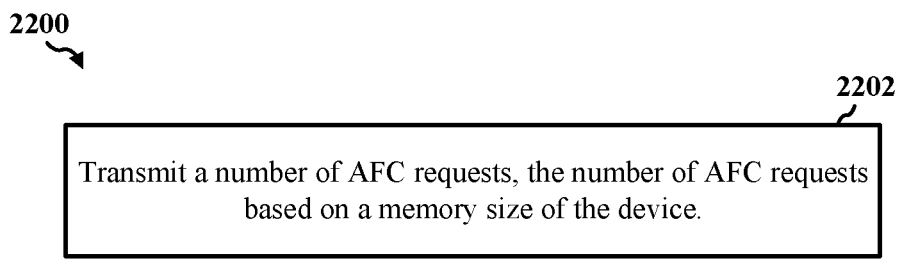

FIG. 22 shows a flowchart illustrating an example operation 2200 for wireless communication that supports AFC requests based on AFC events for controlling a transmit power of a wireless communication device, according to some implementations. The operation 2200 may be in addition to the operation 1400, and the device performing operations 1400 and 2200 may be an AP, a STA, a cellular network controller, or another suitable device. At 2202, the device transmits a number of AFC requests, the number of AFC requests based on a memory size of the device. In some implementations, the number of AFC requests may also be based on a required minimum number or frequency of AFC requests to be transmitted. The device may replace older entries in the table or device memory with AFC data from new AFC responses (such as in a first in first out (FIFO) order). Alternatively, the device may not store the newly received AFC data in the table or device memory.

Various implementations to reduce the number of AFC requests transmitted to an AFC server or other portions of a cellular network are described above. As noted above, any suitable device may be used to perform the operations described above. For example, an AP, a STA, or a cellular network component may perform one or more of the operations. A cellular network component may include any suitable component of the cellular network. While the examples may describe communicating with a network entity (such as transmitting AFC requests to or receiving AFC requests from a network entity), a network entity as used in the example above may refer to one or multiple network entities of a cellular network. In addition, while a cellular network component is described as one component of a cellular network, a cellular network component may include a combination of components. For example, a cellular network component to assist with AFC may include one or more network entities, an RNC, and a location server of a cellular network. Various machine learning models, logistic models, and other models are described above with reference to reducing the number of AFC requests to an AFC server. One or more models may be implemented in hardware, software, or a combination of both in the device performing the AFC operations. For example, an AP or STA may store in memory a machine learning model, which may be implemented in any suitable processor readable code, and trained hyperparameters of the machine learning model. The code including the machine learning model with the trained hyperparameters may be executed by any suitable processor of the AP or STA to cause the AP or STA to perform the operations of the trained machine learning model. In addition, while the above examples are described with reference to setting a transmit power and, optionally, a transmit frequency for transmitting in a 6 GHz wireless band, various operations described above may be applied to determining the transmit power or transmit frequency for other wireless frequency bands. For example, if AFC is extended to other frequency bands, the operations described above may be extended to those other frequency bands to determine a transmit power and one or more wireless channels to be used for transmission. Other variations to the examples above may also exist that do not remove the examples from the scope of the present disclosure.

Implementation examples are described in the following numbered clauses:

Clause 1. A device, including:
at least one processor; and at least one memory communicatively coupled with the at least one processor and storing processor-readable code that, when executed by the at least one processor, is configured to cause the device to:
transmit an automated frequency coordination (AFC) request;
receive an AFC response, where the AFC response includes an AFC power level indication of one or more nearest neighboring entities to the device;
set a transmit power of the device based at least in part on the AFC power level indication of at least one of the one or more nearest neighboring entities; and
transmit at the transmit power.

Clause 2. The device of clause 1, where execution of the processor readable code is further configured to cause the device to:
transmit a first number of AFC requests during a first instance of travelling; and
transmit a second number of AFC requests less than the first number of AFC requests during one or more successive instances after the first instance of travelling, where the second number of AFC requests is based at least in part on setting the transmit power to an AFC power level indication of a neighboring entity, of the one or more nearest neighboring entities, independent of transmitting another AFC request.

Clause 3. The device of clause 2, where execution of the processor-readable code is further configured to cause the device to set the second number of AFC requests to a required minimum for performing AFC.

Clause 4. The device of any one or more of clauses 1-3, where the AFC power level indication of the one or more nearest neighboring entities are stored in a table identifying the one or more nearest neighboring entities, a location of each of the one or more nearest neighboring entities, and the AFC power level indication of the one or more nearest neighboring entities.

Clause 5. The device of any one or more of clauses 1-4, where the AFC power level indication is a binary indication as to whether or not a standard power (SP) transmit power is allowed.

Clause 6. The device of any one or more of clauses 1-5, where the AFC response includes a VendorExtension object to indicate the AFC power level indication of the one or more nearest neighboring entities.

Clause 7. The device of any one or more of clauses 1-6, where the AFC response includes a frequency indicator of the one or more nearest neighboring entities to the device, where execution of the processor-readable code is further configured to cause the device to set a transmit frequency based at least in part on the frequency indicator of the one or more nearest neighboring entities to the device, and where transmission at the transmit power includes transmission at the transmit frequency.

Clause 8. A method for wireless communications by a device, including:
transmitting an automated frequency coordination (AFC) request;
receiving an AFC response, where the AFC response includes an AFC power level indication of one or more nearest neighboring entities to the device;
setting a transmit power of the device based at least in part on the AFC power level indication of at least one of the one or more nearest neighboring entities; and
transmitting at the transmit power.

Clause 9. The method of clause 8, further including:
transmitting a first number of AFC requests during a first instance of travelling; and
transmitting a second number of AFC requests less than the first number of AFC requests during one or more successive instances after the first instance of travelling, where the second number of AFC requests is based at least in part on setting the transmit power to an AFC power level indication of a neighboring entity, of the one or more nearest neighboring entities, independent of transmitting another AFC request.

Clause 10. The method of clause 9, further including setting the number of AFC requests to a required minimum for performing AFC.

Clause 11. The method of any one or more of clauses 8-10, where the one or more AFC power level indication of the one or more nearest neighboring entities are stored in a table identifying the one or more nearest neighboring entities, a location of each of the one or more nearest neighboring entities, and the AFC power level indication of the one or more nearest neighboring entities.

Clause 12. The method of any one or more of clauses 8-11, where the AFC power level indication is a binary indication as to whether or not a standard power (SP) transmit power is allowed.

Clause 13. The method of any one or more of clauses 8-12, where the AFC response includes a VendorExtension object to indicate the AFC power level indication of the one or more nearest neighboring entities.

Clause 14. The method of any one or more of clauses 8-13, where the AFC response includes a frequency indicator of the one or more nearest neighboring entities to the device, where the device sets a transmit frequency based at least in part on the frequency indicator of the one or more nearest neighboring entities to the device and transmission at the transmit power includes transmission at the transmit frequency.

Clause 15. A device, including:
at least one processor; and
at least one memory communicatively coupled with the at least one processor and storing processor-readable code that, when executed by the at least one processor, is configured to cause the device to:
  transmit, to a network component in a cellular network, an automated frequency coordination (AFC) request based at least in part on an AFC event;
  receive, from the network component, an AFC response;
  identify a transmit power to be used by one of an access point (AP) or a station (STA) based on the AFC response; and
  instruct that the one of the AP or the STA use a specific transmit power level for transmission.

Clause 16. The device of clause 15, where:
the device is included in the one of the AP or the STA;
the AFC request is transmitted to a network entity;
the AFC response is received from the network entity; and
the AFC event includes one of:
  the one of the AP or the STA crossing a cellular based location border;
  a handoff of the AP between network entities; or
  an AFC associated timer indicating an AFC request is to be sent.

Clause 17. The device of clause 16, where execution of the processor-readable code is further configured to cause the device to:
obtain a plurality of locations of the one of the AP or the STA associated with a plurality of AFC events during one or more instances of travelling;
determine a location pattern over time of the one of the AP or the STA based at least in part on the plurality of locations of the one of the AP or the STA associated with the plurality of AFC events; and
transmit a second number less than a first number of AFC requests to the network entity during a successive instance after the one or more instances of travelling based at least in part on the location pattern, where the first number of AFC requests is transmitted during an instance of the one or more instances of travelling and the second number of AFC requests is based at least in part on setting the transmit power of the one of the AP or the STA to a transmit power associated with one of the plurality of locations of the one of the AP or the STA and one of the plurality of AFC events independent of transmitting another AFC request.

Clause 18. The device of any one or more of clauses 15-17, where:
the device is included in a cellular network controller to receive one or more AFC requests from the AP and provide one or more AFC responses to the AP;
the AFC event includes receiving an AFC request from the AP;
the AFC request to be transmitted by the device is to be transmitted to an AFC server in the cellular network; and
the AFC response to be received by the device is to be received from the AFC server.

Clause 19. The device of clause 18, where execution of the processor-readable code is further configured to cause the device to:
obtain one or more locations of the one of the AP or the STA during one or more instances of the one of the AP or the STA travelling, where the one or more locations are associated with one or more AFC events; and
obtain a corresponding transmit power associated with each of the one or more locations.

Clause 20. The device of clause 19, where execution of the processor-readable code is further configured to cause the device to:
receive another AFC request from the AP;
obtain a first location of the one of the AP or the STA; and
transmit an AFC response to the AP independent of transmitting an AFC request to the AFC server, where the AFC response indicates a current transmit power to be used by the one of the AP or the STA, where the current transmit power is based at least in part on the first location of the one of the AP or the STA, the one or more locations of the one of the AP or the STA, and the one or more corresponding transmit powers associated with the one or more locations.

Clause 21. The device of clause 20, where execution of the processor-readable code is further configured to cause the device to:
transmit a first number of AFC requests to the AFC server during a first instance of the one of the AP or the STA travelling, where the first number of AFC requests is associated with the one of the AP or the STA;
determine one or more of:
  a location pattern of the one of the AP or the STA over time based at least in part on the one or more locations of the one of the AP or the STA; or
  an AFC request pattern of the AP over time based at least in part on one or more AFC requests received from the AP; and
transmit a second number of AFC requests less than the first number of AFC requests to the AFC server during one or more successive instances after the first instance of the one of the AP or the STA travelling, where:
  the second number of AFC requests is based at least in part on transmitting one or more AFC responses to the AP indicating a transmit power to be used by the one of the AP or the STA based at least in part on one or more of the location pattern or the AFC request pattern; and
  the one or more AFC responses transmitted to the AP are transmitted independent of transmitting another AFC request to the AFC server.

Clause 22. The device of clause 21, where execution of the processor-readable code is further configured to cause the device to:
receive a first number of AFC responses associated with the first number of AFC requests, where:
the second number of AFC requests is based on the location pattern; and
the location pattern is determined based on a logistic model and the first number of AFC requests.

Clause 23. The device of clause 15, where execution of the processor-readable code is further configured to cause the device to transmit a plurality of AFC requests, where the plurality of AFC requests are transmitted in a random manner.

Clause 24. The device of any one or more of clauses 15-23, where execution of the processor-readable code is further configured to cause the device to:

transmit a first number of AFC requests to the AFC server during a first instance of the one of the AP or the STA travelling, where transmitting each of the first number of AFC requests is based on expiration of a first time at a timer; and transmit a second number of AFC requests to the AFC server during a second instance of the one of the AP or the STA travelling, where transmitting each of the second number of AFC requests is based on expiration of a second time at the timer, where the second time is greater than the first time.

Clause 25. The device of any one or more of clauses 15-24, where execution of the processor-readable code is further configured to cause the device to transmit a number of AFC requests, where the number of AFC requests is based on a memory size of the device.

Clause 26. The device of any one or more of clauses 15-25, where the device is to identify a transmit frequency to be used and instruct the one of the AP or the STA to use the transmit frequency for transmission.

Clause 27. A method for wireless communications by a device, including:

transmitting, to a network component in a cellular network, an automated frequency coordination (AFC) request based at least in part on an AFC event;

receiving, from the network component, an AFC response;

identifying a transmit power to be used by one of an access point (AP) or a station (STA) based on the AFC response; and instructing that the one of the AP or the STA use a specific transmit power level for transmission.

Clause 28. The method of clause 27, where:
the device is included in the one of the AP or STA;
the AFC request is transmitted to a network entity;
the AFC response is received from the network entity; and
the AFC event includes one of:
 the one of the AP or the STA crossing a cellular based location border;
 a handoff of the AP between network entities; or
 an AFC associated timer indicating an AFC request is to be sent.

Clause 29. The method of clause 28, further including:
obtaining a plurality of locations of the one of the AP or the STA associated with a plurality of AFC events during one or more instances of travelling;
determining a location pattern over time of the one of the AP or the STA based at least in part on the plurality of locations of the one of the AP or the STA associated with the plurality of AFC events; and
transmitting a second number less than a first number of AFC requests to the network entity during a successive instance after the one or more instances of travelling based at least in part on the location pattern, where the first number of AFC requests is transmitted during an instance of the one or more instances of travelling and the second number of AFC requests is based at least in part on setting the transmit power of the one of the AP or the STA to a transmit power associated with one of the plurality of locations of the one of the AP or the STA and one of the plurality of AFC events independent of transmitting another AFC request.

Clause 30. The method of any one or more of clauses 27-29, where:
the device is included in a cellular network controller to receive one or more AFC requests from the AP and provide one or more AFC responses to the AP;
the AFC event includes receiving an AFC request from the AP;
the AFC request to be transmitted by the device is to be transmitted to an AFC server in the cellular network; and
the AFC response to be received by the device is to be received from the AFC server.

Clause 31. The method of clause 30, further including:
obtaining one or more locations of the one of the AP or the STA during one or more instances of the one of the AP or the STA travelling, where the one or more locations are associated with one or more AFC events; and
obtaining a corresponding transmit power associated with each of the one or more locations.

Clause 32. The method of clause 31, further including:
receiving another AFC request from the AP;
obtaining a first location of the one of the AP or the STA; and
transmitting an AFC response to the AP independent of transmitting an AFC request to the AFC server, where the AFC response indicates a current transmit power to be used by the one of the AP or the STA, where the current transmit power is based at least in part on the first location of the one of the AP or the STA, the one or more locations of the one of the AP or the STA, and the one or more corresponding transmit powers associated with the one or more locations.

Clause 33. The method of clause 32, further including:
transmitting a first number of AFC requests to the AFC server during a first instance of the one of the AP or the STA travelling, where the first number of AFC requests is associated with the one of the AP or the STA;
determining one or more of:
 a location pattern of the one of the AP or the STA over time based at least in part on the one or more locations of the one of the AP or the STA; or
 an AFC request pattern of the AP over time based at least in part on one or more AFC requests received from the AP; and
transmitting a second number of AFC requests less than the first number of AFC requests to the AFC server during one or more successive instances after the first instance of the one of the AP or STA travelling, where:
 the second number of AFC requests is based at least in part on transmitting one or more AFC responses to the AP indicating a transmit power to be used by the one of the AP or the STA based at least in part on one or more of the location pattern or the AFC request pattern; and
 the one or more AFC responses transmitted to the AP are transmitted independent of transmitting another AFC request to the AFC server.

Clause 34. The method of clause 33, further including receiving a first number of AFC responses associated with the first number of AFC requests, where:
the second number of AFC requests is based on the location pattern; and
the location pattern is determined based on a logistic model and the first number of AFC requests.

Clause 35. The method of any one or more of clauses 27-34, further including transmitting a plurality of AFC requests, where the plurality of AFC requests are transmitted in a random manner.

Clause 36. The method of any one or more of clauses 27-35, further including:

transmitting a first number of AFC requests to the AFC server during a first instance of the one of the AP or the STA travelling, where transmitting each of the first number of AFC requests is based on expiration of a first time at a timer; and transmitting a second number of AFC requests to the AFC server during a second instance of the one of the AP or the STA travelling, where transmitting each of the second number of AFC requests is based on expiration of a second time at the timer, where the second time is greater than the first time.

Clause 37. The method of any one or more of clauses 27-36, further including:

transmitting a number of AFC requests, where the number of AFC requests is based on a memory size of the device.

Clause 38. The method of any one or more of clauses 27-37, where the device identifies a transmit frequency to be used and instructs the one of the AP or the STA to use the specific transmit frequency for transmission.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A device, comprising:
at least one processor; and
at least one memory communicatively coupled with the at least one processor and storing processor-readable code that, when executed by the at least one processor, is configured to cause the device to:
transmit an automated frequency coordination (AFC) request;
receive an AFC response, wherein the AFC response includes an AFC power level indication of one or more nearest neighboring entities to the device;
set a transmit power of the device based at least in part on the AFC power level indication of at least one of the one or more nearest neighboring entities; and
transmit at the transmit power.

2. The device of claim 1, wherein execution of the processor readable code is further configured to cause the device to:
transmit a first number of AFC requests during a first instance of travelling; and
transmit a second number of AFC requests less than the first number of AFC requests during one or more successive instances after the first instance of travelling, wherein the second number of AFC requests is based at least in part on setting the transmit power to an AFC power level indication of a neighboring entity, of the one or more nearest neighboring entities, independent of transmitting another AFC request.

3. The device of claim 2, wherein execution of the processor-readable code is further configured to cause the device to set the second number of AFC requests to a required minimum for performing AFC.

4. The device of claim 1, wherein the AFC power level indication of the one or more nearest neighboring entities are stored in a table identifying the one or more nearest neighboring entities, a location of each of the one or more nearest neighboring entities, and the AFC power level indication of the one or more nearest neighboring entities.

5. The device of claim 1, wherein the AFC power level indication is a binary indication as to whether or not a standard power (SP) transmit power is allowed.

6. The device of claim 1, wherein the AFC response includes a VendorExtension object to indicate the AFC power level indication of the one or more nearest neighboring entities.

7. The device of claim 1, wherein the AFC response includes a frequency indicator of the one or more nearest neighboring entities to the device, wherein execution of the processor-readable code is further configured to cause the device to set a transmit frequency based at least in part on the frequency indicator of the one or more nearest neighboring entities to the device, and wherein transmission at the transmit power includes transmission at the transmit frequency.

8. A method for wireless communications by a device, comprising:
   transmitting an automated frequency coordination (AFC) request;
   receiving an AFC response, wherein the AFC response includes an AFC power level indication of one or more nearest neighboring entities to the device;
   setting a transmit power of the device based at least in part on the AFC power level indication of at least one of the one or more nearest neighboring entities; and
   transmitting at the transmit power.

9. The method of claim 8, further comprising:
   transmitting a first number of AFC requests during a first instance of travelling; and
   transmitting a second number of AFC requests less than the first number of AFC requests during one or more successive instances after the first instance of travelling, wherein the second number of AFC requests is based at least in part on setting the transmit power to an AFC power level indication of a neighboring entity, of the one or more nearest neighboring entities, independent of transmitting another AFC request.

10. A device, comprising:
    at least one processor; and
    at least one memory communicatively coupled with the at least one processor and storing processor-readable code that, when executed by the at least one processor, is configured to cause the device to:
      transmit, to a network component in a cellular network, an automated frequency coordination (AFC) request based at least in part on an AFC event;
      receive, from the network component, an AFC response;
      identify a transmit power to be used by one of an access point (AP) or a station (STA) based on the AFC response; and
      instruct that the one of the AP or the STA use a specific transmit power level for transmission,
      wherein the AFC event includes one of:
        the one of the AP or the STA crossing a cellular based location border;
        a handoff of the AP between network entities; or
        an AFC associated timer indicating an AFC request is to be sent.

11. The device of claim 10, wherein:
    the device is included in the one of the AP or the STA;
    the AFC request is transmitted to a network entity; and
    the AFC response is received from the network entity.

12. The device of claim 11, wherein execution of the processor-readable code is further configured to cause the device to:
    obtain a plurality of locations of the one of the AP or the STA associated with a plurality of AFC events during one or more instances of travelling;
    determine a location pattern over time of the one of the AP or the STA based at least in part on the plurality of locations of the one of the AP or the STA associated with the plurality of AFC events; and
    transmit a second number less than a first number of AFC requests to the network entity during a successive instance after the one or more instances of travelling based at least in part on the location pattern, wherein the first number of AFC requests is transmitted during an instance of the one or more instances of travelling and a second number of AFC requests is based at least in part on setting the transmit power of the one of the AP or the STA to a transmit power associated with one of the plurality of locations of the one of the AP or the STA and one of the plurality of AFC events independent of transmitting another AFC request.

13. The device of claim 10, wherein:
    the device is included in a cellular network controller to receive one or more AFC requests from the AP and provide one or more AFC responses to the AP;
    the AFC event includes receiving an AFC request from the AP;
    the AFC request to be transmitted by the device is to be transmitted to an AFC server in the cellular network; and
    the AFC response to be received by the device is to be received from the AFC server.

14. The device of claim 13, wherein execution of the processor-readable code is further configured to cause the device to:
    obtain one or more locations of the one of the AP or the STA during one or more instances of the one of the AP or the STA travelling, wherein the one or more locations are associated with one or more AFC events; and
    obtain a corresponding transmit power associated with each of the one or more locations.

15. The device of claim 14, wherein execution of the processor-readable code is further configured to cause the device to:
    receive another AFC request from the AP;
    obtain a first location of the one of the AP or the STA; and
    transmit an AFC response to the AP independent of transmitting an AFC request to the AFC server, wherein the AFC response indicates a current transmit power to be used by the one of the AP or the STA, wherein the current transmit power is based at least in part on the first location of the one of the AP or the STA, the one or more locations of the one of the AP or the STA, and the one or more corresponding transmit powers associated with the one or more locations.

16. The device of claim 15, wherein execution of the processor-readable code is further configured to cause the device to:
    transmit a first number of AFC requests to the AFC server during a first instance of the one of the AP or the STA travelling, wherein the first number of AFC requests is associated with the one of the AP or the STA;
    determine one or more of:
      a location pattern of the one of the AP or the STA over time based at least in part on the one or more locations of the one of the AP or the STA; or an AFC request pattern of the AP over time based at least in part on one or more AFC requests received from the AP; and transmit a second number of AFC requests less than the first number of AFC requests to the AFC server during one or more successive instances after the first instance of the one of the AP or the STA travelling, wherein:

the second number of AFC requests is based at least in part on transmitting one or more AFC responses to the AP indicating a transmit power to be used by the one of the AP or the STA based at least in part on one or more of the location pattern or the AFC request pattern; and the one or more AFC responses transmitted to the AP are transmitted independent of transmitting another AFC request to the AFC server.

17. The device of claim 16, wherein execution of the processor-readable code is further configured to cause the device to:

receive a first number of AFC responses associated with the first number of AFC requests, wherein:

the second number of AFC requests is based on the location pattern; and the location pattern is determined based on a logistic model and the first number of AFC requests.

18. The device of claim 10, wherein execution of the processor-readable code is further configured to cause the device to transmit a plurality of AFC requests, wherein the plurality of AFC requests are transmitted in a random manner.

19. The device of claim 10, wherein execution of the processor-readable code is further configured to cause the device to:

transmit a first number of AFC requests to the AFC server during a first instance of the one of the AP or the STA travelling, wherein transmitting each of the first number of AFC requests is based on expiration of a first time at a timer; and transmit a second number of AFC requests to the AFC server during a second instance of the one of the AP or the STA travelling, wherein transmitting each of the second number of AFC requests is based on expiration of a second time at the timer, wherein the second time is greater than the first time.

20. The device of claim 10, wherein execution of the processor-readable code is further configured to cause the device to transmit a number of AFC requests, wherein the number of AFC requests is based on a memory size of the device.

21. The device of claim 10, wherein the device is to identify a transmit frequency to be used and instruct the one of the AP or the STA to use the transmit frequency for transmission.

22. A method for wireless communications by a device, comprising:

transmitting, to a network component in a cellular network, an automated frequency coordination (AFC) request based at least in part on an AFC event;

receiving, from the network component, an AFC response;

identifying a transmit power to be used by one of an access point (AP) or a station (STA) based on the AFC response; and instructing that the one of the AP or the STA use a specific transmit power level for transmission, wherein the AFC event includes one of:

the one of the AP or the STA crossing a cellular based location border;

a handoff of the AP between network entities; or an AFC associated timer indicating an AFC request is to be sent.

23. The method of claim 22, wherein:

the device is included in the one of the AP or STA;

the AFC request is transmitted to a network entity; and the AFC response is received from the network entity.

24. The method of claim 23, further comprising:

obtaining a plurality of locations of the one of the AP or the STA associated with a plurality of AFC events during one or more instances of travelling;

determining a location pattern over time of the one of the AP or the STA based at least in part on the plurality of locations of the one of the AP or the STA associated with the plurality of AFC events; and transmitting a second number less than a first number of AFC requests to the network entity during a successive instance after the one or more instances of travelling based at least in part on the location pattern, wherein the first number of AFC requests is transmitted during an instance of the one or more instances of travelling and a second number of AFC requests is based at least in part on setting the transmit power of the one of the AP or the STA to a transmit power associated with one of the plurality of locations of the one of the AP or the STA and one of the plurality of AFC events independent of transmitting another AFC request.

25. The method of claim 22, wherein:

the device is included in a cellular network controller to receive one or more AFC requests from the AP and provide one or more AFC responses to the AP;

the AFC event includes receiving an AFC request from the AP;

the AFC request to be transmitted by the device is to be transmitted to an AFC server in the cellular network; and the AFC response to be received by the device is to be received from the AFC server.

26. The method of claim 25, further comprising:

obtaining one or more locations of the one of the AP or the STA during one or more instances of the one of the AP or the STA travelling, wherein the one or more locations are associated with one or more AFC events; and obtaining a corresponding transmit power associated with each of the one or more locations.

27. The method of claim 26, further comprising:

receiving another AFC request from the AP;

obtaining a first location of the one of the AP or the STA; and transmitting an AFC response to the AP independent of transmitting an AFC request to the AFC server, wherein the AFC response indicates a current transmit power to be used by the one of the AP or the STA, wherein the current transmit power is based at least in part on the first location of the one of the AP or the STA, the one or more locations of the one of the AP or the STA, and the one or more corresponding transmit powers associated with the one or more locations.

28. The method of claim 27, further comprising:

transmitting a first number of AFC requests to the AFC server during a first instance of the one of the AP or the STA travelling, wherein the first number of AFC requests is associated with the one of the AP or the STA;

determining one or more of:

a location pattern of the one of the AP or the STA over time based at least in part on the one or more locations of the one of the AP or the STA; or an AFC request pattern of the AP over time based at least in part on one or more AFC requests received from the AP; and transmitting a second number of AFC requests less than the first number of AFC requests to the AFC server during one or more successive instances after the first instance of the one of the AP or STA travelling, wherein:

the second number of AFC requests is based at least in part on transmitting one or more AFC responses to the AP indicating a transmit power to be used by the one of the AP or the STA based at least in part on one or more of the location pattern or the AFC request pattern; and the one or more AFC responses transmitted to the AP are transmitted independent of transmitting another AFC request to the AFC server.

29. The method of claim 28, further comprising receiving a first number of AFC responses associated with the first number of AFC requests, wherein:

the second number of AFC requests is based on the location pattern; and the location pattern is determined based on a logistic model and the first number of AFC requests.

30. The method of claim 22, further comprising:

transmitting a first number of AFC requests to the AFC server during a first instance of the one of the AP or the STA travelling, wherein transmitting each of the first number of AFC requests is based on expiration of a first time at a timer; and transmitting a second number of AFC requests to the AFC server during a second instance of the one of the AP or the STA travelling, wherein transmitting each of the second number of AFC requests is based on expiration of a second time at the timer, wherein the second time is greater than the first time.

\* \* \* \* \*